US012658824B2

(12) United States Patent
Somers et al.

(10) Patent No.: US 12,658,824 B2
(45) Date of Patent: Jun. 16, 2026

(54) POWER CONVERTER

(71) Applicant: DCBEL INC., Montréal (CA)

(72) Inventors: Cedric Somers, Saint-Amable (CA);
Ernest Montllo Casabayo, Montréal
(CA); Jean-Hugues Deschênes,
Montréal (CA); Paulo Barroso,
Brossard (CA); Marc-André Forget,
Saint-Lazare (CA)

( * ) Notice: Subject to any disclaimer, the term of this
patent is extended or adjusted under 35
U.S.C. 154(b) by 0 days.

(21) Appl. No.: 19/396,658

(22) Filed: Nov. 21, 2025

(65) Prior Publication Data

US 2026/0081541 A1 Mar. 19, 2026

Related U.S. Application Data

(63) Continuation-in-part of application No.
PCT/IB2025/056970, filed on Jul. 9, 2025, and a
(Continued)

(51) Int. Cl.
*H02M 7/797* (2006.01)
(52) U.S. Cl.
CPC .................................... *H02M 7/797* (2013.01)
(58) Field of Classification Search
CPC .... H02M 7/797; H02M 7/81; H02M 7/53862;
H02M 7/53873; H02M 7/5388;
(Continued)

(56) References Cited

U.S. PATENT DOCUMENTS 9,701,208 B2 7/2017 Berger
10,978,948 B2 4/2021 Du et al.
(Continued)

FOREIGN PATENT DOCUMENTS

CA 3181128 A1 12/2021
CN 101145740 A 3/2008
(Continued)

OTHER PUBLICATIONS

Zhang, D. et al., Nonisolated Three-Phase Current DC-Link Buck-
Boost EV Charger With Virtual Output Midpoint Grounding and
Ground Current Control. IEEE Transactions on Transportation
Electrification, vol. 10, No. 1, pp. 1398-1413, Mar. 2024, DOI:
10.1109/TTE.2023.3282978.
(Continued)

*Primary Examiner* — Nguyen Tran
(74) *Attorney, Agent, or Firm* — Anglehart et al.

(57) ABSTRACT

With a coupled pair of inductors brought between front end
and back end power switches, and with the DC voltage split
using a pair of series connected capacitors and the midpoint
being connected to the AC neutral, power conversion can be
achieved with reduced ripple and/or total harmonic distor-
tion. The two pairs of series connected back end switches are
connected between AC neutral and a respective DC terminal
with the midpoint between each pair of back end switches
being connected to one of the coupled pair of inductors. A
switch controller is operative to receive an input defining a
direction of power conversion from AC to DC or DC to AC
and a level of power conversion or a target output voltage of
power conversion to generate gate signals for the power
switches accordingly.

20 Claims, 17 Drawing Sheets

Related U.S. Application Data continuation-in-part of application No. PCT/CA2024/051634, filed on Dec. 6, 2024.

(60) Provisional application No. 63/669,491, filed on Jul. 10, 2024, provisional application No. 63/608,020, filed on Dec. 8, 2023.

(58) Field of Classification Search
CPC ............ H02M 7/02; H02M 7/04; H02M 7/08; H02M 7/10
See application file for complete search history.

(56) References Cited

U.S. PATENT DOCUMENTS

| | | | |
|---|---|---|---|
| 11,811,300 B2 | 11/2023 | Vahedi et al. | |
| 11,831,235 B1 | 11/2023 | Vahedi et al. | |
| 2011/0204849 A1 | 8/2011 | Mukai et al. | |
| 2014/0049996 A1* | 2/2014 | Ku ..................... | H02M 7/5388 363/71 |
| 2014/0347769 A1 | 11/2014 | Kanda et al. | |
| 2017/0133947 A1* | 5/2017 | Fu ..................... | H02M 1/0064 |
| 2019/0058408 A1* | 2/2019 | Hao ..................... | H02M 3/01 |
| 2021/0155104 A1 | 5/2021 | Skutt et al. | |
| 2021/0218342 A1 | 7/2021 | Zmood et al. | |
| 2022/0021299 A1 | 1/2022 | Miyazaki et al. | |

FOREIGN PATENT DOCUMENTS

| | | | |
|---|---|---|---|
| DE | 102005047373 A1 | 4/2007 | |
| EP | 2306629 A2 | 4/2011 | |
| EP | 2698911 B1 | 8/2019 | |
| WO | 2009/132427 A1 | 11/2009 | |
| WO | 2022/171947 A1 | 8/2022 | |
| WO | 2024/145720 A1 | 7/2024 | |

OTHER PUBLICATIONS

Nima Tashakor et al., A Simplified Analysis of Equivalent Resistance in Modular Multilevel Converters with Parallel Functionality. Published in: IECON 2020 The 46th Annual Conference of the IEEE Industrial Electronics Society. Date of Conference: Oct. 18-21, 2020. Date Added to IEEE Xplore: Nov. 18, 2020. DOI: 10.1109/IECON43393.2020.9255157.

Saeed Arazm et al., Generalized ZPUC Topology for Modular Multilevel Converter Applications. Published in: IECON 2020 The 46th Annual Conference of the IEEE Industrial Electronics Society. Date of Conference: Oct. 18-21, 2020. Date Added to IEEE Xplore: Nov. 18, 2020. ISBN. DOI: 10.1109/IECON43393.2020.9255393.

Alexandr Ikriannikov, The Benefits of the Coupled Inductor Technology. Maxim Integrated, San Jose, CA, USA, Tutorial, 2014. pp. 1-10.

Vitor Monteiro et al., Review of Five-Level Front-End Converters for Renewable-Energy Applications. Front. Energy Res., Oct. 15, 2020. Sec. Process and Energy Systems Engineering. vol. 8—2020 | https://doi.org/10.3389/fenrg.2020.00172.

Ahmed Morsy et al., A New High Power Density Modular Multilevel DC-DC Converter with Localized Voltage Balancing Control for Arbitrary Number of Levels. Published in: 2016 IEEE Applied Power Electronics Conference and Exposition (APEC). Date of Conference: Mar. 20-24, 2016. Date Added to IEEE Xplore: May 12, 2016. DOI: 10.1109/APEC.2016.7468226.

International application No. PCT/IB2025/ 056970 International Search Report and Written Opinion of the International Searching Authority dated Oct. 21, 2025.

International application No. PCT/CA2024/051634 International Search Report and Written Opinion of the International 8 Searching Authority dated Apr. 15, 2025.

* cited by examiner

I3

| Switch Pattern | S1 | S2 | S3 | S4 | S5 | S6 | Result |
|---|---|---|---|---|---|---|---|
| A | 1 | 0 | 1 | 0 | 1 | 0 | AC is positive, power flows |
| B | 0 | 1 | 1 | 0 | 1 | 0 | Ground state through S5 |
| C | 1 | 0 | 0 | 1 | 0 | 1 | Ground state through S4 |
| D | 0 | 1 | 0 | 1 | 0 | 1 | AC is negative, power flows |

EV

Ground-referenced AC power input

100

Non-Isolated Bidirectional AC-to-DC Charger

190e

190d

190c

190b

190a

190

?

Ground

POWER CONVERTER

The present application is a continuation-in-part of PCT patent application Ser. No. PCT/IB2025/056970 filed Jul. 9, 2025, designating the US, claims priority of U.S. provisional patent application Ser. No. 63/669,491 filed Jul. 10, 2024, and the present application is also a continuation-in-part of PCT/CA2024/051634 filed Dec. 6, 2024, designating the US, claims priority of U.S. provisional patent application Ser. No. 63/608,020 filed Dec. 8, 2023, the contents of which are hereby incorporated by references.

TECHNICAL FIELD

The present patent application concerns power AC to DC conversion.

BACKGROUND

Bidirectional power converters able to convert DC power to AC power in an inverter mode and able to convert AC power to DC power in an active rectifier mode are well known in the art. It is desirable to have a converter circuit that reduces heat dissipation of the power switches, capacitors and inductors, while reducing the ripple or fluctuations in the converted power.

SUMMARY

In the proposed solution, a power converter is provided in which the inductor is brought between front end and back end power switches and the inductor is a pair of inductors. The DC voltage is split using a pair of series connected capacitors with the midpoint being connected to the AC neutral. The two pairs of series connected back end switches are connected between AC neutral and a respective DC terminal with the midpoint between each pair of back end switches being connected to one of the coupled pair of inductors.

Such a topology of power converter is disclosed in PCT publication WO2022/171947 to offer a reduced voltage at power switches, however, magnetic coupling between the pair of inductors is absent. Applicant has found that magnetic coupling between the pair of inductors can offer an improvement in the ripple or noise generated by the power converter during power conversion without interfering with the power conversion efficiency or functionality of the power converter.

BRIEF DESCRIPTION OF THE DRAWINGS

The invention will be better understood by way of the following detailed description of embodiments of the invention with reference to the appended drawings, in which.

DETAILED DESCRIPTION

Figure 1:
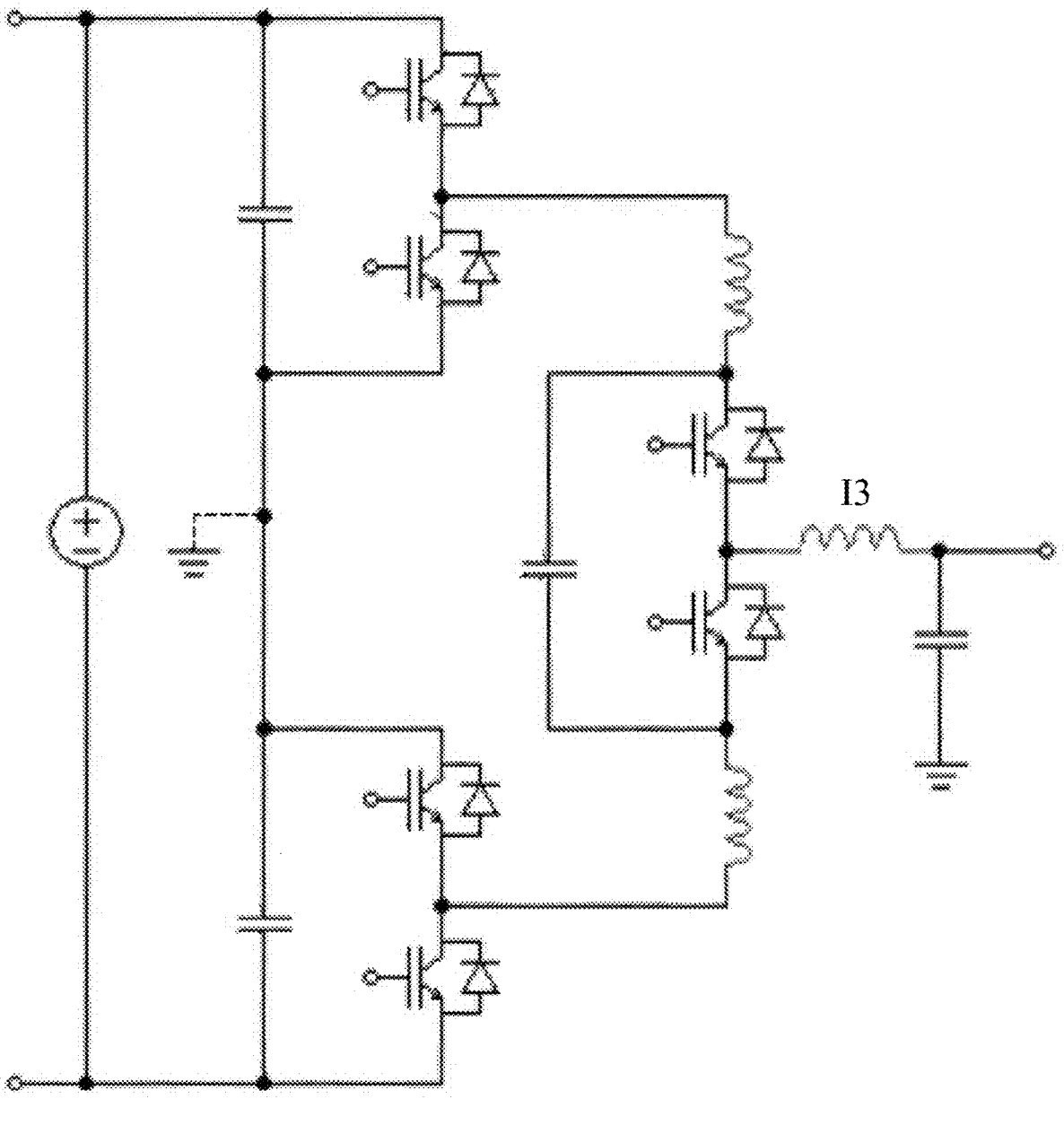
FIG. 1 is a schematic diagram of a power converter topology according to the prior art.
Figure 4:
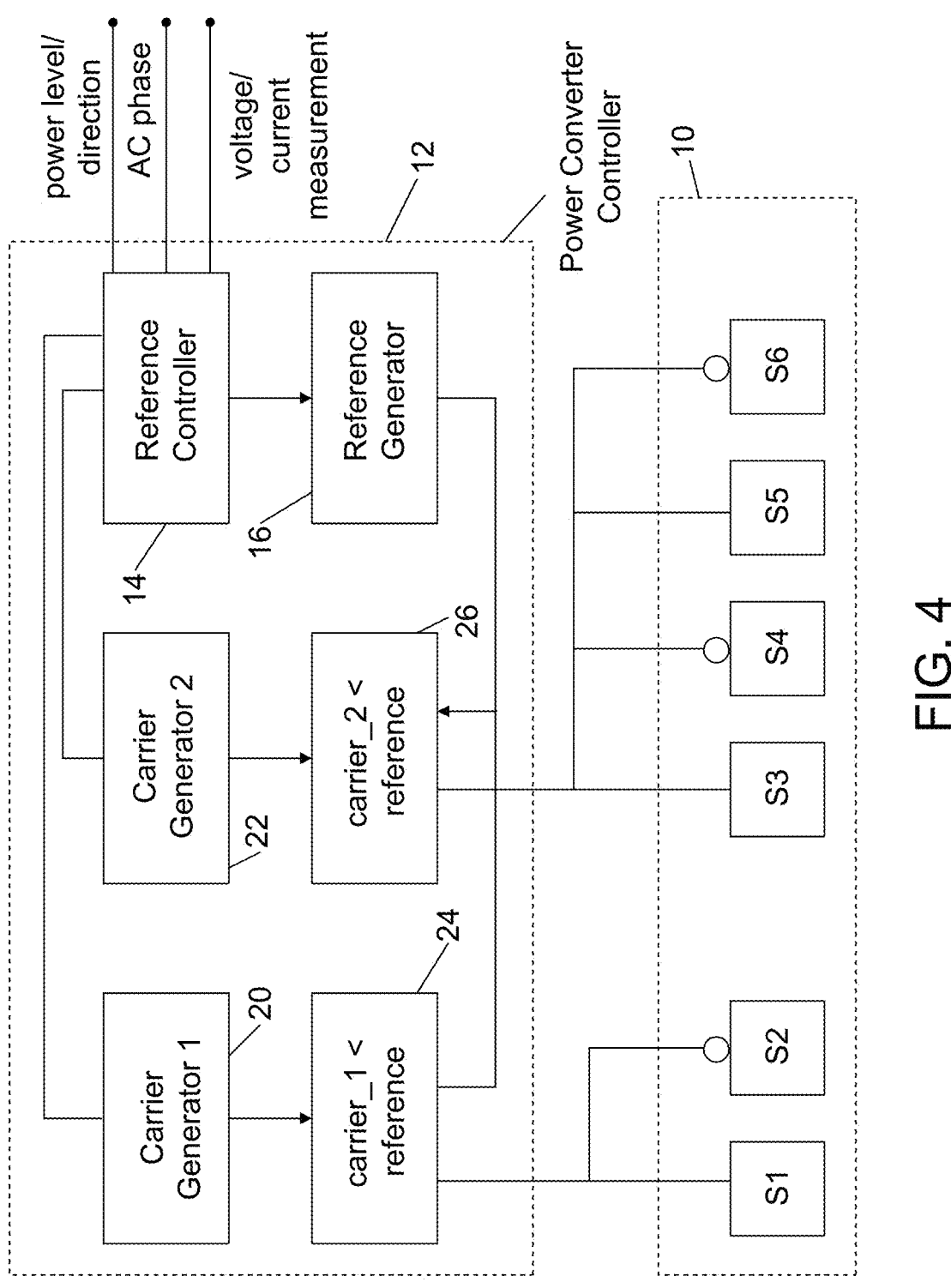
FIG. 4 is a schematic diagram of a power converter controller for the power converter topology of FIG. 2 according to an embodiment.

FIG. 1 shows FIG. 4 from PCT patent application publication WO2022/171947 published 18 Aug. 2022 with the reference numerals removed so as to avoid confusion with the reference numerals used in the drawings of the present application. As described therein, the power converter topology represents an improvement in the circuitry for power conversion, for example in the number and the voltages handled by the power switches.

Figure 2:
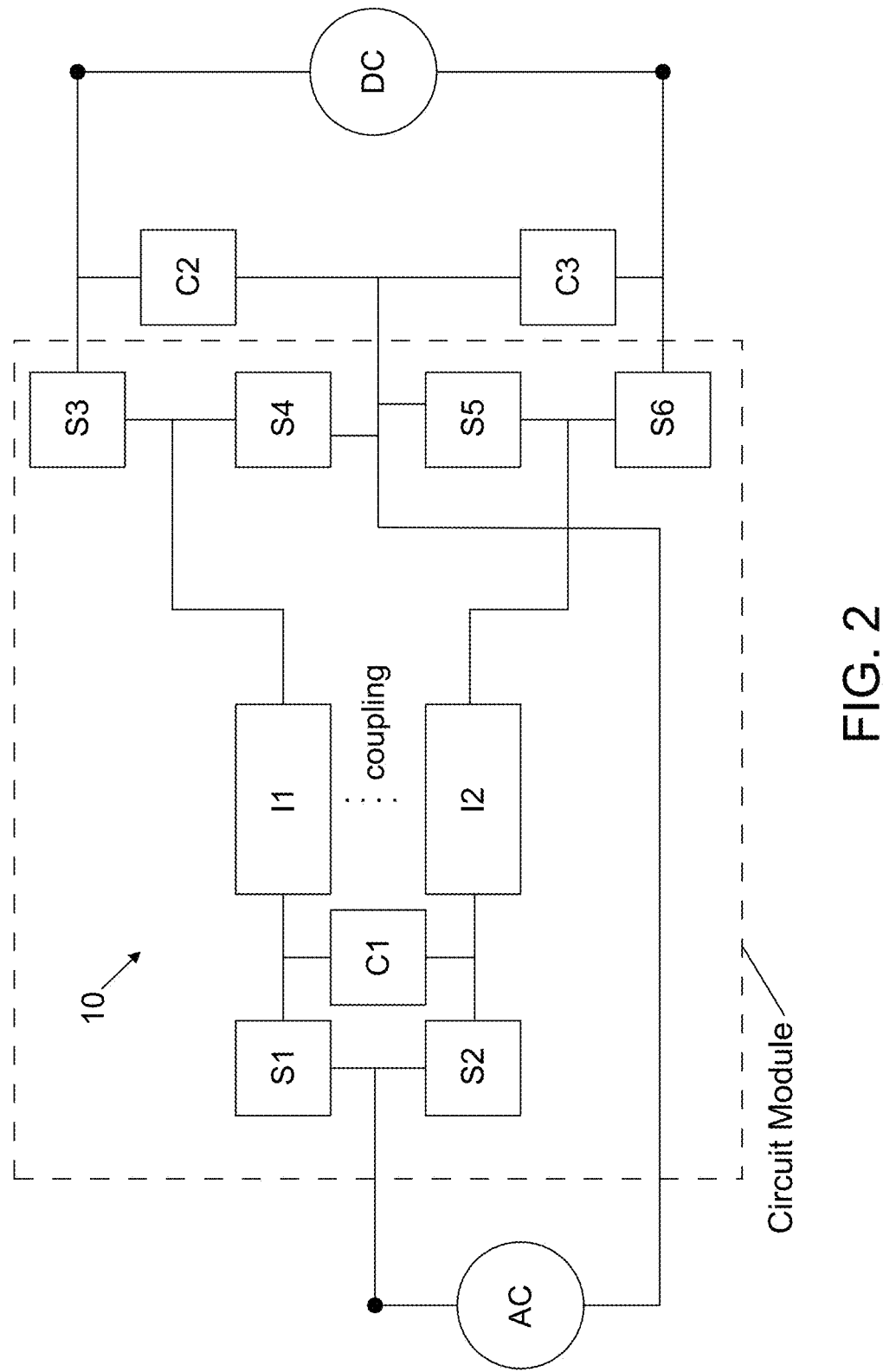
FIG. 2 is a schematic diagram of a power converter topology according to a first embodiment.

FIG. 2 shows a topology of a power converter 10 in which a phase of AC power is connected between a front end node and a neutral node. The front end node is connected between power switches S1 and S2. The other side of switches S1 and S2 are connected to separate but magnetically-coupled inductors I1 and I2 and to a capacitor C1. As can be seen, an inductor at the AC side, such as inductor I3 shown in FIG. 1, is not shown although such an inductor may be present as part of any filter circuit on the AC side.

As will be described in more detail below, the magnetic coupling of the same polarity between I1 and I2 can be from about 50% to more than 95%. Inductor I1 on its other side is connected to a midpoint between power switches S3 and S4, while I2 on its other side is connected to a midpoint between power switches S5 and S6. Power switch S3 is connected to one DC terminal and capacitor C2, and power switch S6 is connected to the other DC terminal and capacitor C3, while S4 and S5 both connect to the neutral node and the midpoint between C2 and C3 that are connected in series between the DC terminals. In this configuration, S1 and S2 can be considered front end switches, and S3 to S6 back end switches.

While variations to the topology of FIG. 2 are possible by adding additional components, the core components illustrated in FIG. 2 will remain.

While it is common for such a power converter to include a DC to DC conversion stage to buck or to boost the ultimate DC voltage on the DC input or output side, in some embodiments, the circuit of FIG. 2 can be used without including a DC to DC stage.

While FIG. 2 illustrates a single-phase converter 10, it will be appreciated that two or three phases can be provided by replicating the circuit module as shown for each phase. Capacitors C2 and C3 can be shared by the circuit modules or each circuit module can have its own capacitors.

FIGS. 3A through 3D show plots obtained from a simulation using LTspice® 24.0.12 of the circuit of FIG. 2. In the simulation, ideal switches and diodes were used to simplify the result analysis, however, non-zero resistances were added to conductors (20 mΩ as reference). Open loop control was used to minimize other effects, and the only control variable was Vref sinewave amplitude. The value of C1 was chosen as 110 μF and the value of C2 and C3 was chosen as 5 mF. I1 and I2 were chosen to have inductances of 0.5 mH. In the simulation, a single phase (60 Hz) of 120 Vrms was generated in inverter mode from a DC source of about 450 V with a peak current of 100 A. In rectifier mode, 120 Vrms was converted to about 450 Vdc.

Figure 3A:
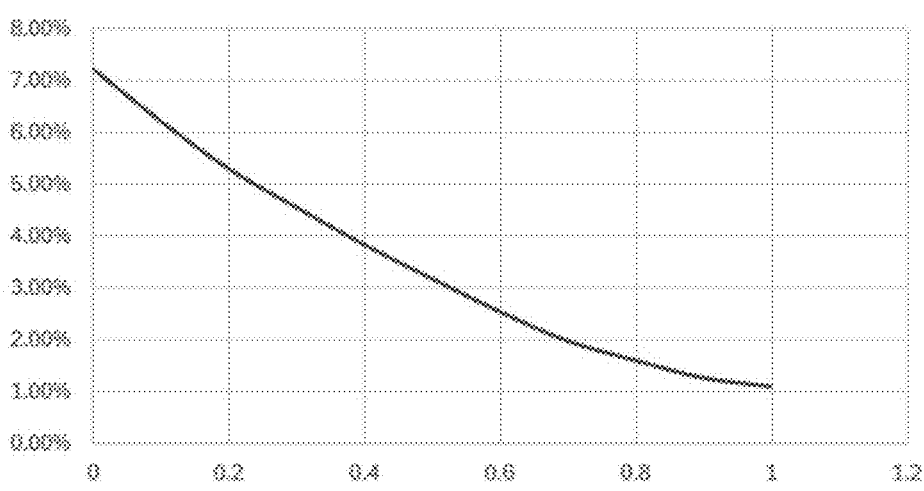
FIG. 3A is a plot obtained by simulation of the circuit of FIG. 2 showing total harmonic distortion (THD) at the AC side of the power converter operated in an inverter mode as a function of magnetic coupling between the pair of inductors for given operating conditions showing a reduction in THD from about 7% to about 1% with increasing magnetic coupling.

As shown in FIG. 3A, THD at the AC side in inverter mode would be about 7% if I1 and I2 were not magnetically coupled at all. The decrease in simulated THD drops almost linearly to about 1% as 99% magnetic coupling is reached. As can be seen, at about 50% of magnetic coupling, THD is reduced by about 50%. In the simulation, this would be a THD of about 3.2%. It will be appreciated that a magnetically coupled pair of inductors is more costly to produce than a pair of separate inductors and that production cost can increase with the degree of magnetic coupling. Thus, the most desirable level of magnetic coupling may depend on the tolerance for THD on the AC side and/or the cost (in terms of loss of energy conversion efficiency and in material cost) of using appropriate filters on the AC side. For example, if the goal is to keep THD on the AC input/output to be less than 3%, magnetic coupling of about 50%, for example 53% in the simulation, can be sufficient. In this way, an EMI filter is not required. A modest level of magnetic coupling from about 50% to about 75% of magnetic coupling can be achieved inexpensively using pairs of separately wound inductors wrapped on a common core (toroid, straight rod, U-shape or D-shaped rod) or on separate cores that are connected together after wrapping. Levels of magnetic coupling above 80% typically involve special wrapping techniques that are more expensive. Even at a level of magnetic coupling as low as 40%, it can be seen that a significant reduction in THD is achieved without requiring special wrapping techniques, and for example butt coupling of cores of two separately wound inductors can achieve magnetic coupling levels of at least 40%.

Figure 3B:
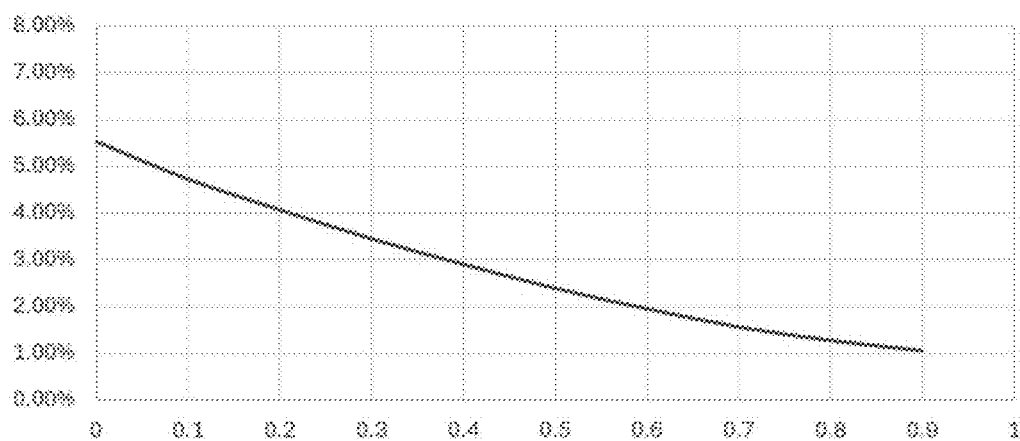
FIG. 3B is a plot obtained by simulation of the circuit of FIG. 2 showing total harmonic distortion at the DC side of the power converter operated in rectifier mode as a function of magnetic coupling between the pair of inductors for given operating conditions showing a reduction in THD from about 5.5% to about 1% with increasing magnetic coupling.
Figure 3C:
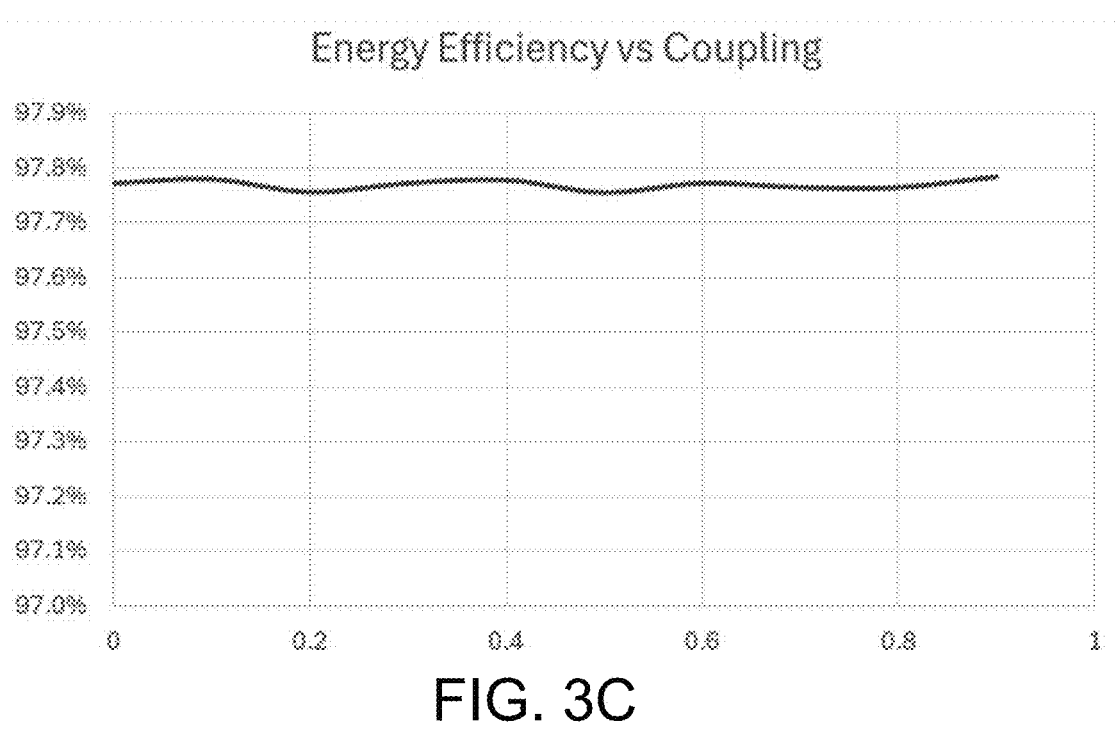
FIG. 3C is a plot obtained by simulation of the circuit of FIG. 2 showing power conversion efficiency of the power converter operated in an inverter mode as a function of magnetic coupling between the pair of inductors for given operating conditions showing that efficiency is not affected by magnetic coupling.
Figure 3D:
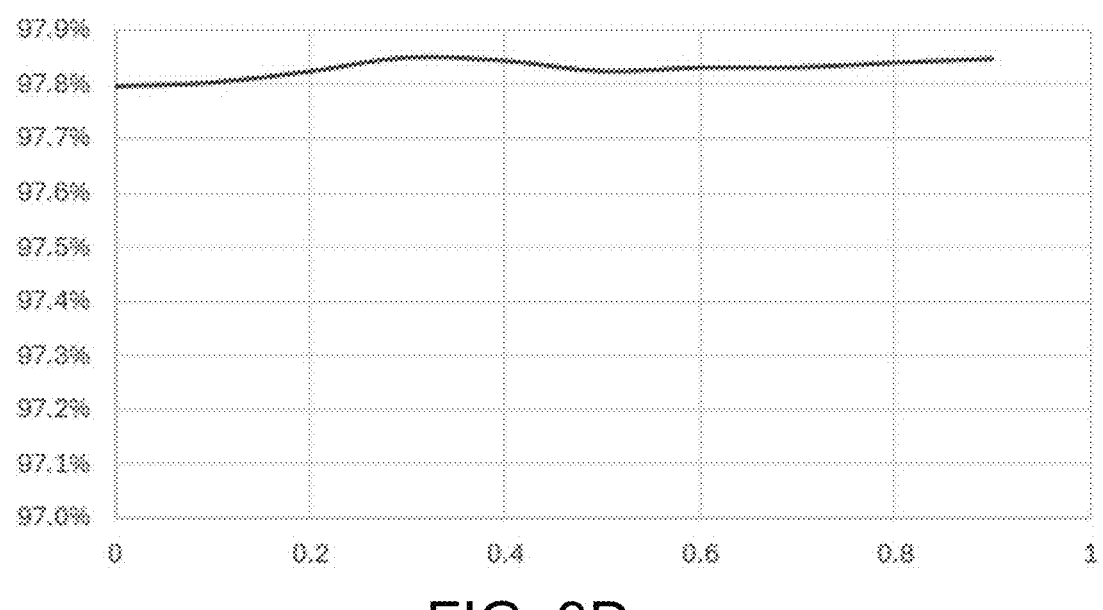
FIG. 3D is a plot obtained by simulation of the circuit of FIG. 2 showing power conversion efficiency of the power converter operated in a rectifier mode as a function of magnetic coupling between the pair of inductors for given operating conditions showing that efficiency is minimally affected by magnetic coupling.

As shown in FIG. 3B, THD at the DC side in rectifier mode would be about 5.5% if I1 and I2 were not magnetically coupled at all. The decrease in simulated THD drops almost linearly to about 1% as 90% magnetic coupling is reached. In FIG. 3C, the energy efficiency of the converter circuit is shown to be essentially invariable as magnetic coupling between I1 and I2 is increased from 0% to 90% magnetic coupling. The efficiency in inverter mode for the simulated converter is around 97.75%. In the rectifier mode, as shown in FIG. 3D, the energy efficiency of the simulated power converter is between 97.80% and 97.85%, and is essentially invariable as magnetic coupling between I1 and I2 is increased from 0% to 90% magnetic coupling.

FIG. 4 schematically illustrate an embodiment of a power converter controller 12 that can be used to control the switch states for power switches S1 through S6 in the embodiment of FIG. 2. In FIG. 4, the converter 10 is schematically illustrated as comprising only the switches S1 through S6 for simplicity of illustration. In this embodiment, a reference signal generator controller 14 determines the phase and amplitude of a reference signal. Since the reference signal when compared to carrier signals is used to determine power switch states, it is responsible for defining the behavior of the power converter. The reference controller thus uses an input defining the power level or voltage to be generated, an AC phase measurement and one or more measurement values of voltage and/or current in the circuit. The values of the phase and amplitude of the reference signal are output from the controller 14 to the reference signal generator 16 to generate the desired reference signal.

In the embodiment of FIG. 4, two carrier generators 20 and 22 are used to generate carrier signals (e.g., triangular waves) of the same frequency that are 180 degree out of phase with respect to each other. The phase difference and the frequency of the carrier generators 20 and 22 may be fixed by design, or they may be initialized by the reference controller 14. While the reference signal is typically 50 Hz or 60 Hz to be in phase with the desired AC power, the frequency of the carrier signals defining the switching frequency is typically above 8 kHz to about 30 kHz, although some switches may be efficient for operation at higher frequencies. By having the reference in phase with the AC power, unity power factor can be provided. The first carrier signal is used to modulate the front end switches S1 and S2, as illustrated such that when S1 is on, S2 is off, and when S2 is on, S1 is off. The second carrier signal is used to modulate the back end switches such that when S3 and S5 are on, S4 and S6 or off and vice versa. In this embodiment, carrier signal 1 is compared to the reference and the logical state for S1 is defined by carrier 1 being less than the reference signal using, for example, comparator logic circuit 24. In this embodiment, carrier signal 2 is compared to the reference and the logical state for S3 and S5 is defined by carrier 2 being less than the reference signal using, for example, comparator logic circuit 26.

The controller 12 of FIG. 4 can be implemented using an FPGA, an ASIC or other dedicated circuitry, or using a processor such as a microcontroller. Given the calculations and decision that may be made by the reference controller 14, it may be implemented using a processor while the remaining components of controller 12 may be implemented using circuitry.

In one example of a prototype of the power converter made in accordance with the embodiment of FIG. 2 using the controller of FIG. 4, the values of the components were chosen, and the resulting performance was as follows:

Model of power switch for S1 and S2: 2 parallel MSC015SMA070B4 or UJ4SC075009K4S
  Model of power switch for S3 to S6: Power module MSCSM70TAM19CT3AG.
  Value of C1: 170 uF
  Value of C2 and C3: 5 mF
  Value of I1: 500 uH
  Value of I2: 500 uH
  Percentage of coupling between I1 and I2: 90%
  Nominal AC voltage: 120 Vrms, 60 Hz.
  Frequency of carrier signal: 20 kHz
  Output DC voltage range (active rectifier): 500V
  Power transfer capacity in rectifier mode: 10 kVA
  Estimated efficiency of conversion in rectifier mode: >95%
  Level of ripple in DC output: 5% of half the DC bus (example 12.5V on 250 Vdc half bus with DC voltage of 500 V)
  Nominal DC input in inverter mode: same as rectifier mode
  Nominal power transfer capacity in inverter mode: same as rectifier mode
  Estimated efficiency of conversion in inverter mode: >95%
  THD in AC output: 3% in grid-to-vehicle (rectifier) or vehicle-to-grid (inverter mode)

It will be understood that different logical comparisons of carrier to reference signals to define the states of the switches can be used to arrive at a suitable switch control.

It will also be understood that the model of carrier signal and reference signal comparison is a suitable analog technique for power switch control, while in a processor-based implementation, switch gate values can be calculated in real-time or they can be pre-determined in a table that is accessed in real-time by the processor to output signals to control switch gates.

It will be understood that the application of switch gate signals to power switches can make use of deadtime management circuitry or deadtime management in software (see Applicant's U.S. Pat. No. 11,831,235) as required. While schematically illustrated as single devices, power switches can comprise plural electronic switch components in parallel or series as desired. While the power switches can be any conventional power electronic switch, power switches generate negligible heat when in the on state and no heat when in the off state. However, heat is generated when in the transition between the two states. When the switch transition time from on to off or vice versa is a significant source of heat due to a slow transition time, switches of different transition time characteristics can be used in parallel and favorably combined to reduce heat generation due to switching transitions.

Figures 5A, 5B:
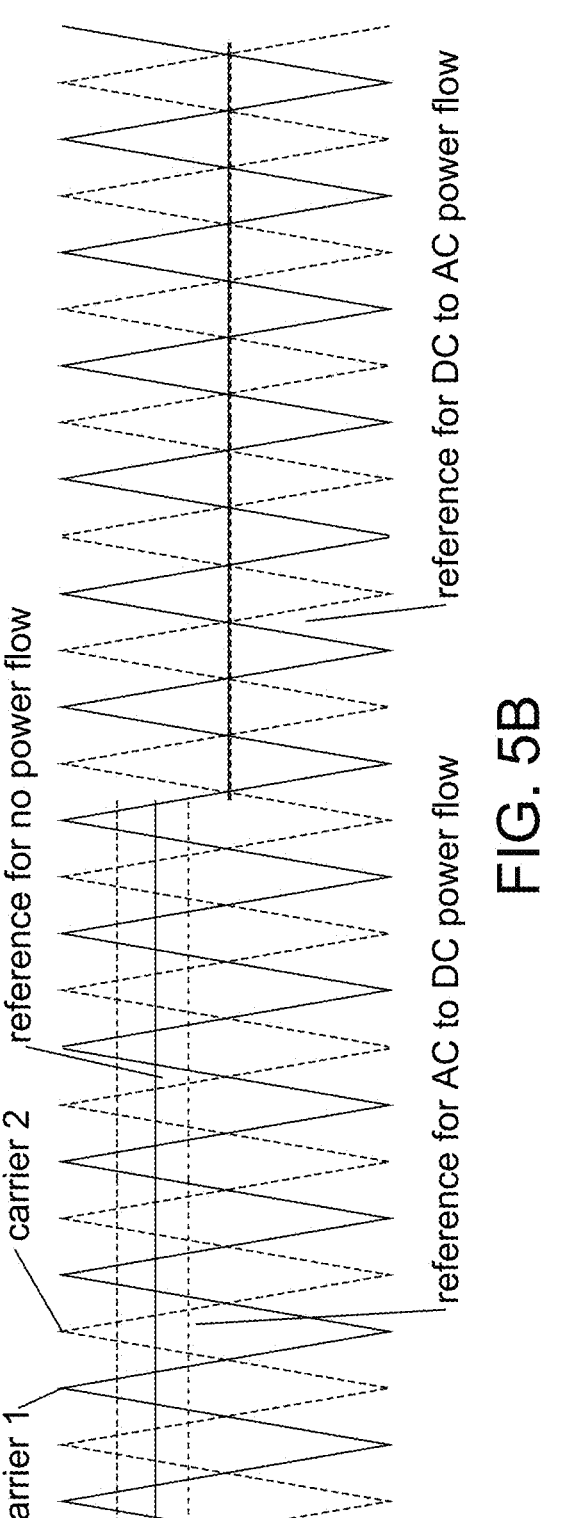
FIG. 5A is a table of power switch patterns according to an embodiment.
FIG. 5B is a waveform diagram of two triangular wave carrier signals and three different sinusoidal reference signals schematically illustrating how the reference signal amplitude affects the direction of power conversion from AC to DC or DC to AC.

FIG. 5A illustrates a table of the switch patterns A through D for the six power switches of the embodiment of FIG. 2. In pattern A, AC is positive and power flows through the power converter 10. In pattern B, the power converter is in a ground state, with the ground path being through S5. In pattern C, the power converter is in a ground state, with the ground path being through S4. In pattern D, AC is negative and power flows through the power converter.

It will be appreciated that the voltage stored by the series connection of C2 and C3 is always the voltage at the DC terminal. When stored energy is released from C2, for example, this causes current to flow into C3. Likewise, the coupled inductors I1 and I2 have the ability to transfer energy when only one or the other stores energy through changes in current. Capacitor C1 also provides a path for current between the coupled inductors. For this reason, switching between ground states of patterns B and C is important to allow for C2 and C3 to maintain the same voltage and for the release of power transferred through the coupling of the inductors.

FIG. 5B schematically illustrates the carrier signals 1 and 2 with three instances of the reference signal. While the frequency of the carrier signals is actually much higher, for the purposes of illustration, it is shown to be only 7 times greater than the reference frequency. In the case of the solid line reference signal, the amplitude of the reference is such that the duty cycle of the power flow patterns A and D provides a voltage that matches the balance between the existing DC voltage on the DC side and the existing AC voltage on the AC side of the power converter of FIG. 2. The short dashed line reference signal in FIG. 5B illustrates switch control for an inverter mode of operation with its reference signal amplitude being greater than the solid line, no power transfer reference signal. The long dashed line reference signal with an amplitude lower than the solid line, no power transfer reference signal will then provide power transfer in an active rectifier mode.

Figures 6A, 6B, 6C:
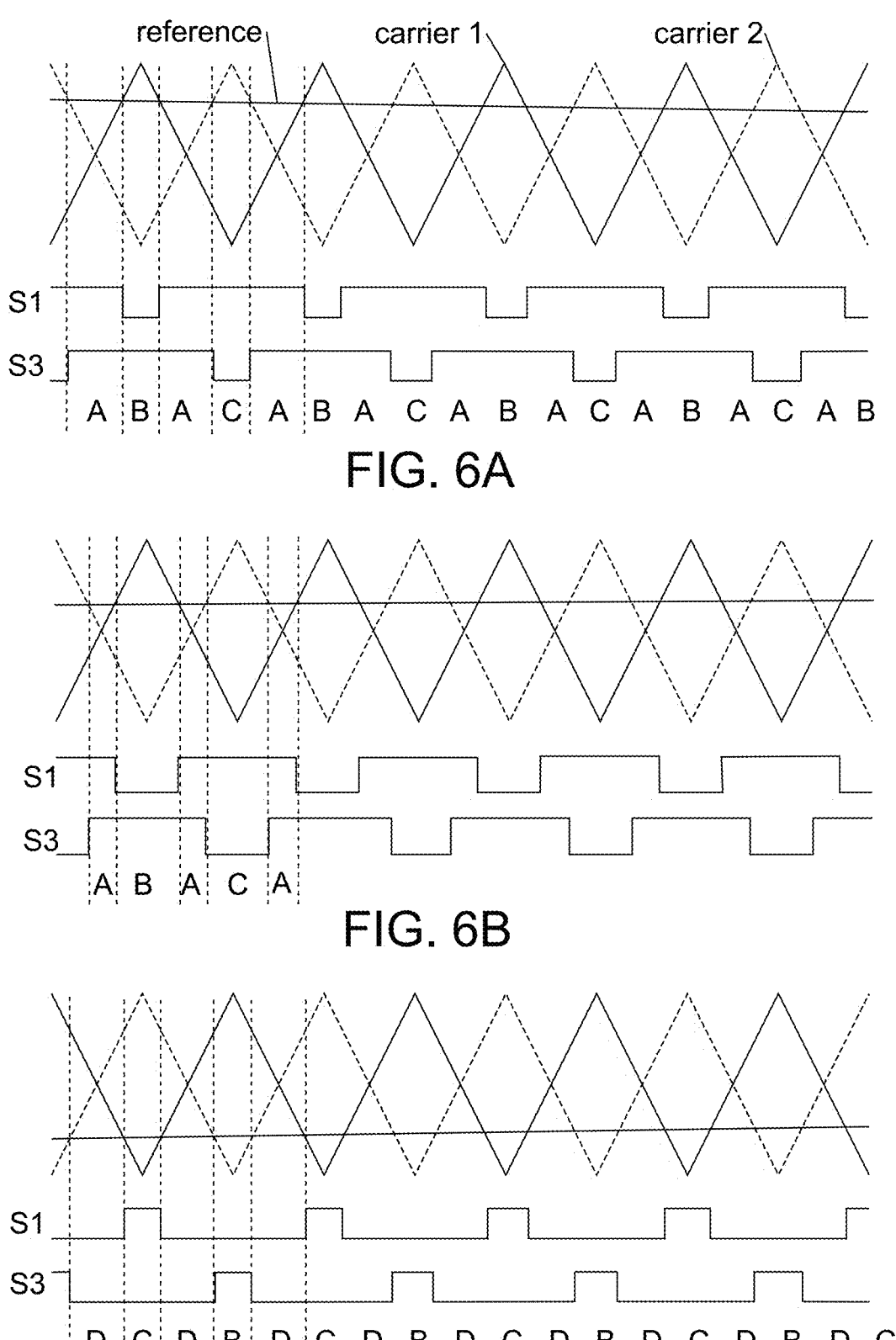
FIG. 6A illustrates the comparison between the reference signal and the two carrier signals when the reference is positive and relatively high, showing also the S1 and S3 states and the switch pattern resulting from FIG. 5A.
FIG. 6B illustrates the comparison between the reference signal and the two carrier signals when the reference is positive and lower than in FIG. 6A, showing also the S1 and S3 states and how the resulting switch pattern changes due to the lower reference signal than in FIG. 6A.
FIG. 6C illustrates the comparison between the reference signal and the two carrier signals when the reference is negative and relatively high (in the negative), showing also the S1 and S3 states and the switch pattern resulting from FIG. 5A.

FIG. 6A illustrates the comparison of the carrier signals to the reference signal when the reference signal is positive and near its peak. This provides longer duty cycles in the power transfer pattern A than in the ground patterns B and C. When the reference signal drops in amplitude, as in FIG. 6B, one can see that the duty cycle of the power transfer pattern A is smaller than the ground patterns B and C. In FIG. 6C, the reference signal is negative (and near its peak) and thus the power transfer pattern is D with ground patterns C and B being alternatively switched to from pattern D. Note that the duty cycle of power transfer pattern D is greater than that for patterns C and B in FIG. 6C, much like it was for the positive reference in FIG. 6A.

Figure 7:
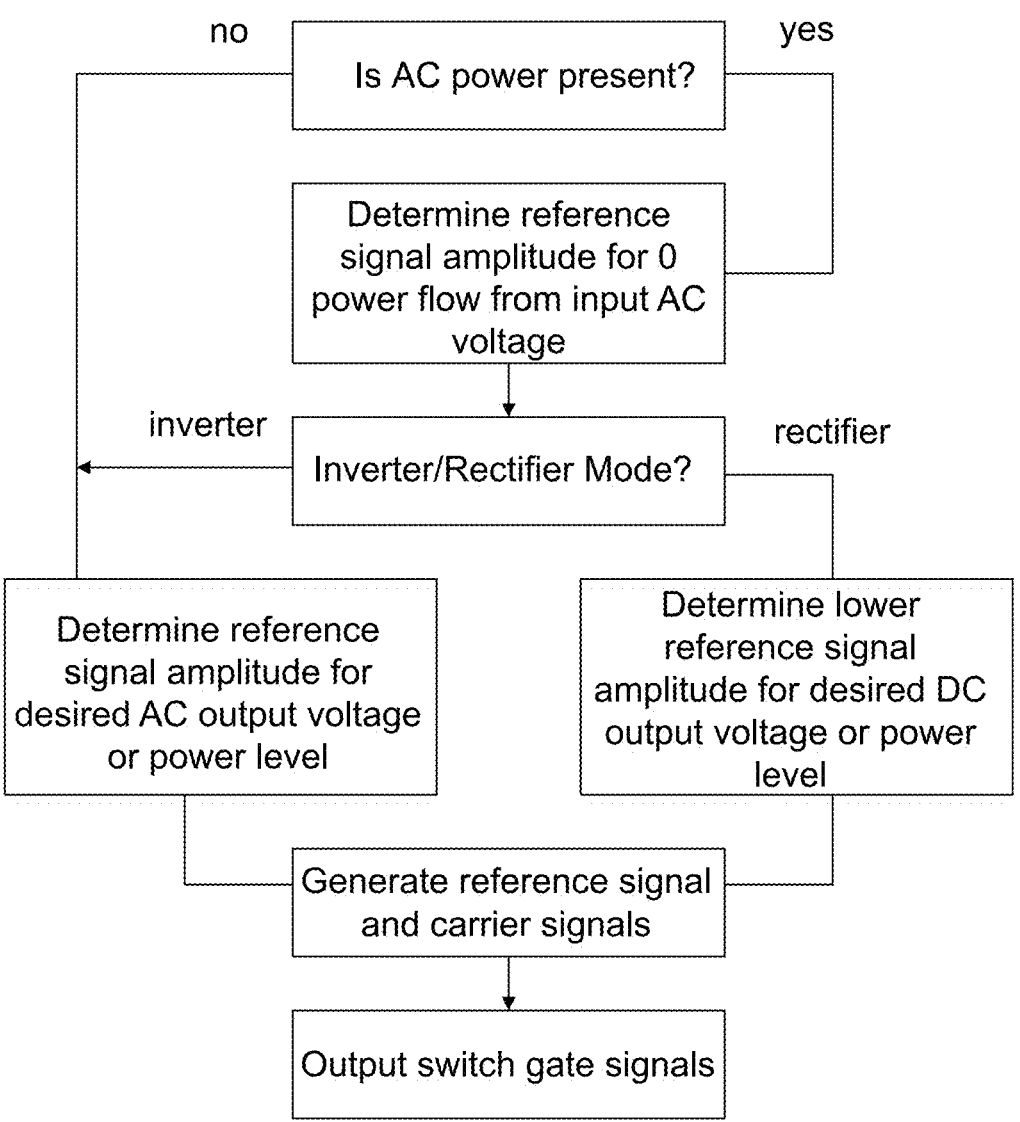
FIG. 7 is a flow chart illustrating step in determining the generation of the switch gate signals according to one embodiment.

FIG. 7 illustrates the flow of processing in the reference controller 14 of FIG. 4. In a first step, the reference controller 14 determines if AC power is present. This may be done by measurement or by operator input, for example. When AC power is present, the phase is recorded and the voltage of the AC power and the voltage of any DC power present may be measured or otherwise provided to the reference controller to determine what suitable amplitude may represent zero power flow under the current conditions. If the power converter 10 is to operate as an inverter, thus pushing power onto the AC grid power, a higher reference amplitude is determined for the desired level of power transfer from the DC side to the AC side. If the power converter 10 is to operate as an active rectifier, thus taking power from the AC grid power to provide DC power, a lower reference amplitude is determined for the desired level of power transfer from the AC side to the DC side. Alternatively, the reference amplitude desired may be determined by using measured current and/or voltage and invoking a feedback loop in which the amplitude of the reference signal is adjusted until the desired power flow is reached.

When the power converter 10 is providing AC power from a DC source without grid tie, the phase of the reference may be arbitrary, and the frequency may be fixed (grid frequency may vary from its nominal frequency of 50 Hz or 60 Hz over time). The reference signal amplitude is set according to the desired islanding AC voltage. However, when the output AC voltage can no longer be maintained at the desired level, this means that the AC load exceeds the ability of the power converter to supply AC power from the DC source. In this case, either an alarm may be triggered or an interruption in inverter power may result.

Once the amplitude and phase of the reference signal has been determined by the reference controller 14, the comparison with the carrier signals and the generation of the switch gate signal can follow in accordance with the above description with reference to FIGS. 4 and 6A to 6C.

Figure 8:
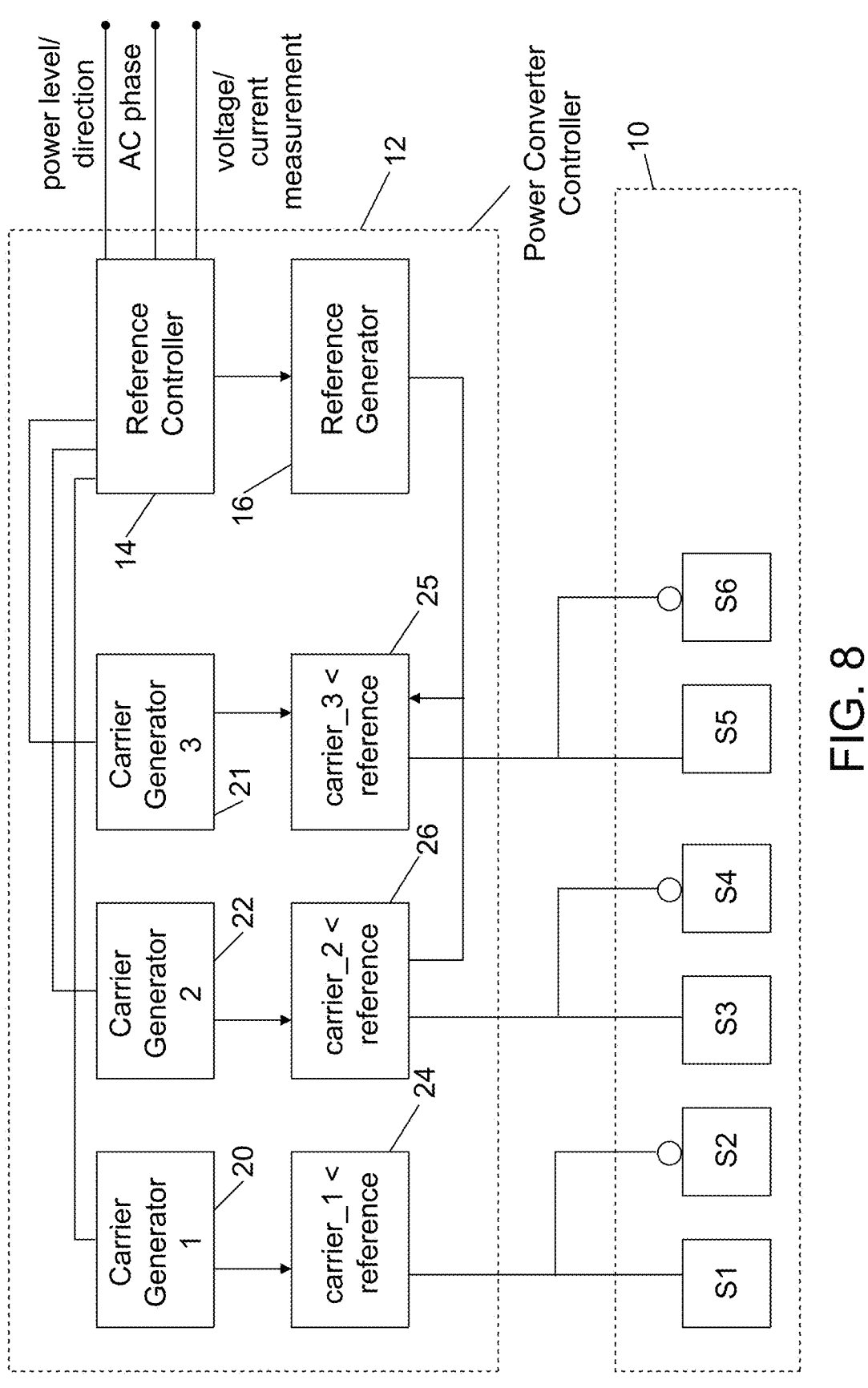
FIG. 8 is a schematic diagram of a power converter controller for the power converter topology of FIG. 2 according to another embodiment.

In the embodiments of FIGS. 4 and 6A to 6C, one example of how two carriers are used for comparison with the reference signal to control the switch gates. It will be appreciated that variations are possible. In FIG. 8, a more complex controller 12 is illustrated that can provide separate control over S3/S4 and S5/S6 by having additional logic 25 for S5/S6 separate from the logic 26 for only S3/S4. With this implementation, the carrier 3 can be at a different phase from carrier 2 such that the switching times of S3/S4 are different from S5/S6. Having different switching of S3/S4 from S5/S6 provides more than the four switch patterns described above that can be used to control the relative energy storage between the upper half-bridge and the lower half-bridge of the back end of converter 10. When switches S5/S6 are switched at different times from S3/S4, this interleaves the two back end half bridges and may be used to create different voltage levels.

Alternatively or additionally, the carrier generators 20,22, 21 are shown in the embodiment of FIG. 8 to be controlled by the reference controller 14 rather than being fixed.

In the case of carriers that are fixed in that they are not changed during operation, not only the phase of the carriers can be differently chosen, but the frequency of carrier 1 can be higher or lower than the carriers 2 and 3 (in the embodiment of FIG. 4, it is possible to have carrier 1 at a frequency different from carrier 2, as well). Operating switches S1/S2 of the front end at a higher frequency causes higher switching losses in the front end, namely S1/S2 than in the back end, namely S3/S4/S5/S6, and can help the charge/discharge cycling of C1 instead of relying on intrinsic self-balancing.

Operating switches S1/S2 of the front end at a lower frequency causes lower switching losses in the front end than in the back end, and making the charge/discharge cycling of C1 greater while improving the charge/discharge cycling of C2/C3 instead of relying on intrinsic self-balancing.

In the case that the carriers are to be changed during operation, this can be done to the relative carrier phases alone, to the carrier frequencies, or both. For example, it is possible for the reference controller 14 (e.g., as may be updated by a co-processor in an FPGA implementation) to measure neutral current, the voltages at capacitors C1, C2 and/or C3 and/or the temperature of switches S1/S2 versus S3 to S6, and respond to an imbalance by changing the phase or frequency of one or more of the carriers accordingly. Switch stress and aging can also be taken into consideration when selecting the phase and/or frequency of the carriers.

While FIG. 4 illustrates that controller 12 controls the switches S1 to S6 of a single circuit module 10, when two or three phase AC power conversion is desired, the controller 12 can also be replicated or adapted to provide switch signals with the suitable 120 degree or 180 degree phase difference for each phase.

Figure 9:
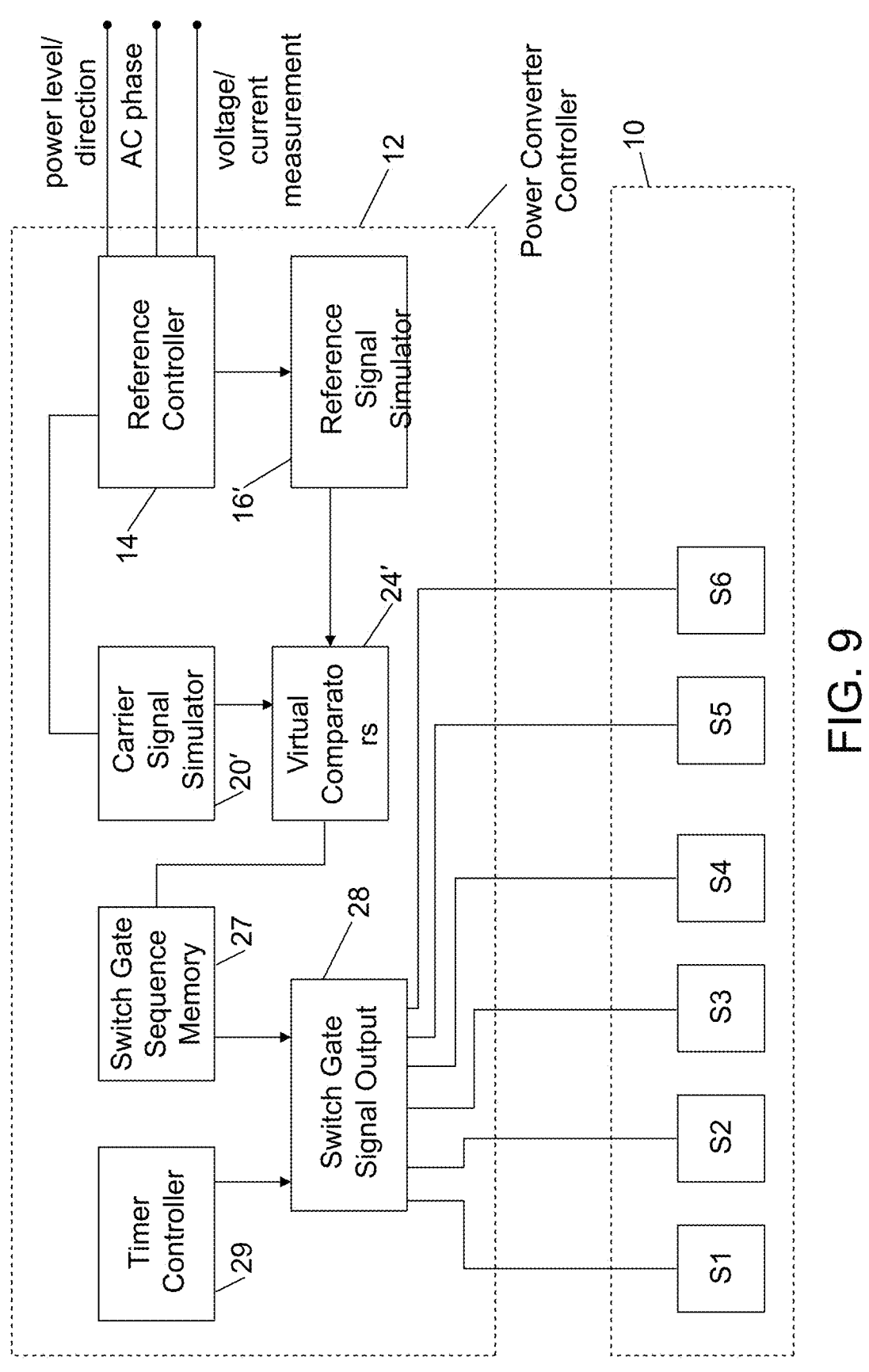
FIG. 9 is a schematic diagram of a power converter controller for the power converter topology of FIG. 2 according to a further embodiment in which switch gate signals are generated from a processor.

As mentioned above, the power converter controller 12 of FIG. 4 can be implemented using fixed or programmable (e.g., FPGA) circuitry and/or using a processor. For clarity, FIG. 9 illustrates a processor implementation of controller 12. In this embodiment, the reference controller 14 as described above with reference to FIGS. 4 and 8 may remain the same with the carrier and reference signal generation being virtualized using simulators 16' and 20'. While a processor-based comparison of the reference signal with the carrier signals may be done using software (e.g., virtual comparators 24'), given the relatively high frequency of the gate signals, it may be preferred not to operate the simulators 16' and 20' and the comparators 24' in real time for real time output of the resulting gate signal to switches S1 to S6. Instead, switch gate values may be stored in memory 27 of the processor or microcontroller (e.g., using peripherals built into a microcontroller), for example a complete cycle of switch gate values. Software 28 executed by the processor may act as a reader to read from memory 27 the switch gate values according to a clock or timer 29 and produce switch gate outputs for S1 through S6 on, for example, pins of the microcontroller or processor of the controller 12. While six outputs are illustrated, two or three outputs, as in the embodiments of FIGS. 4 and 8 may also be produced, and then to use external inverter logic and deadtime management circuitry, for example a peripheral/engine built into the microcontroller, for the purposes of generating all of the switch gate outputs for S1 through S6.

When the reference signal or the carrier signals would be changed as a function of the inputs to controller 14, it is possible to have stored in memory 27 two or more switch gate sequences and for the controller 14 to signal to the switch gate signal output 28 which one of the stored sequences is to be used. Alternatively, the simulators 16' and 20' and comparators 24' may be used to generate a new sequence that once stored in memory 27 can replace the former sequence.

It will be appreciated in the embodiment of FIG. 9 that the reference controller 14 may directly determine the cyclical variation of the duty cycles of the switch patterns without simulating a reference signal, carrier signals and undertaking a comparison to determine the instances of the cycle of switch patterns. In this way, the controller 14 would directly create the table of the switch gate sequence in memory 27 without using software components 16', 20' and 24'.

It will be appreciated that the above power converter may be best suited for use without galvanic isolation and, optionally, while using a ground-fault circuit interrupter (GFCI) at the DC vehicle port. Some embodiments of galvanic isolation-free EV chargers are described in PCT patent application serial number PCT/CA2024/051634 designating the United States and published as international patent publication WO2025/118087A1 on 8 Dec. 2023, the contents of which are1 hereby incorporated by reference.

Advantageous conditions may be achieved by connecting the DC output to the neutral point of the AC mains, which means that the neutral wire, which is connected to ground at the main service panel acts as the reference point for the DC output midpoint. By connecting the DC midpoint to the neutral, the common-mode voltage is directly referenced to the neutral point, which is already grounded. This may help significantly reducing the potential difference between the DC midpoint and ground, thereby minimizing common-mode leakage currents, which makes it simpler comparatively to the virtual ground solution proposed in by Zhang et al. (i.e., D. Zhang, D. Cao, J. Huber, J. Everts and J. W. Kolar, titled "Nonisolated Three-Phase Current DC-Link Buck-Boost EV Charger With Virtual Output Midpoint Grounding and Ground Current Control," published in IEEE Transactions on Transportation Electrification, vol. 10, no. 1, pp. 1398-1413, March 2024, DOI: 10.1109/TTE.2023.3282978), as it relies on the existing neutral-to-ground connection. Since there is no electronic switching system (ESS), no photovoltaic (PV) panel connected to the DC bus, there are no external ground currents, which could create additional common-mode imbalance. Furthermore, the fine adjustment of the of common-mode voltages may be performed on the DC-to-DC side of the AC-to-DC converter.

In some embodiments, a non-isolated high-voltage direct current battery charger may be made compatible with a ground-fault circuit interrupter (GFCI) at the DC output by adapting the power converter to control, in response to voltage or current sensors, a net current difference between forward current and return current to remain below a threshold of the GFCI. This may be done without compromising safety in the case of actual ground faults.

In some embodiments, the power converter may respond to a measurement of the forward and return currents from the EV (or other storage battery) to modulate at least one of them so that the transitory residual current never reaches a given threshold, such as, for example, 20 mA.

In an embodiment, an electric vehicle (EV) battery charger includes: at least two non-isolated AC-to-DC power converters; at least one DC-to-DC power converter connected to an output of each AC-to-DC power converter and configured to provide an EV charging DC output having a positive terminal and a negative terminal with a reference to a signal ground; at least two residual current sensors configured to measure at least one of a current difference between current flowing through the positive terminal versus current flowing through the negative terminal, or a voltage difference between a voltage across the positive terminal and the negative terminal versus a voltage across at least one of the positive terminal or the negative terminal and a chassis ground; and a controller connected to the residual current sensor and to the DC-to-DC power converter and configured to provide an adjustment signal to the EV charging DC output in response to the residual current sensor measurement, wherein the controller in combination with the DC-to- DC converter are configured, when the EV charging DC output is connected to an EV, to prevent a current difference between current flowing through the positive terminal and current flowing through the negative terminal from exceeding a predetermined threshold associated with a ground fault circuit interrupter (GFCI) connected to the EV charging DC output.

In an embodiment, a non-isolated high-voltage charging circuit includes: an input line and an output line; a primary switch connected between the input line and a primary node; a secondary switch connected between the primary node and a signal ground; a primary inductor connected between the primary node and a secondary node; a secondary inductor connected between the secondary node and the output line; a tertiary inductor connected between the secondary node and the signal ground; at least one sensor connected to at least one of the input line or the output line; and a controller having at least one input connected to the at least one sensor, and at least two outputs respectively connected to the primary switch and the secondary switch.

The controller may include a proportional-integral-derivative (PID) controller connected to a pulse-width modulation (PWM) modulator. Moreover, the PID controller may include a primary PID controller responsive to a battery voltage and a difference voltage, and a secondary PID controller responsive to a command current and a difference current.

The charging circuit may further include: a primary capacitor connected between the input line and the signal ground; a secondary capacitor connected between the tertiary inductor and the signal ground; a tertiary capacitor connected between the output line and the signal ground; and a fourth capacitor connected between the output line and a vehicular chassis or Earth ground.

The charging circuit may further include: a second input line and a second output line; a second primary capacitor connected between the second input line and the signal ground; a second primary switch connected between the second input line and a second primary node; a second secondary switch connected between a second primary node and the signal ground; a second primary inductor connected between the second primary node and a second secondary node; a second secondary inductor connected between the second secondary node and the second output line; a second tertiary inductor and a second secondary capacitor connected in series between the second secondary node and the signal ground; a second tertiary capacitor connected between the second output line and the signal ground; and a second sensor connected between the second output line and a charger chassis ground.

In some embodiment, the power converter may be a non-isolated power converter that may be able to measuring the charging voltage and/or current fed to the charging port or battery of a non-isolated DC charger for determining whether a projected difference between forward current and return current is likely to exceed a given threshold (e.g., a 20 mA threshold). In some cases, using this measurement in an active control feedback loop associated with the non-isolated power converter, for example in a direct-current to direct-current (DC-to-DC) voltage converter associated with the non-isolated power converter, to actively control the supplied voltage to the battery, may allow for a non-isolated DC charger to avoid tripping the GFCI device during normal charging operations. In the event that there is an actual ground fault, the active control feedback loop might attempt to reduce voltages to limit residual current to below the given threshold, however, if the active feedback cannot succeed, the GFCI will prevent harm or damage should an actual failure or mis-use provide an unintended path to ground, such as on the side of a device being charged like an electric vehicle (EV).

For example, if the sensitivity of the GFCI is about 20 mA as installed at the connection to an EV's DC charging port (delivering DC power within a range of about 350 V to about 1000 V), any current ripple greater than 20 mA might cause excessive tripping of the GFCI, and thereby cause frequent interruption of the DC charging process.

An embodiment of the present disclosure combines a non-isolated DC charger with a GFCI, to control a net current difference between forward current and return current to remain below a threshold sensitivity of the GFCI.

Figure 10A:
FIGS. 10A and 10B are schematic illustrations of an EV charging environment.

FIG. 10A illustrates the context of an embodiment in which an EV is DC charged using an off-board grounded or non-isolated charger 100 supplied from, for example, AC mains power. The EV has an on-board storage battery 190 and is shown to be parked on the ground. It may be appreciated that battery 190 may comprise a plurality of battery cells, such as, for example, cells 190a/190b/190c/190d, which may be appropriately spaced within battery 190 and may be connected in series and/or in parallel allowing to achieve desired voltage and capacity. When a person touches the chassis or body of the car, a fault in the vehicles could allow DC current to find a path to ground due to the change in the capacitance to ground, while BMS of an EV may connect/disconnect some of the battery cells during charging/discharging process.

Figure 10B:
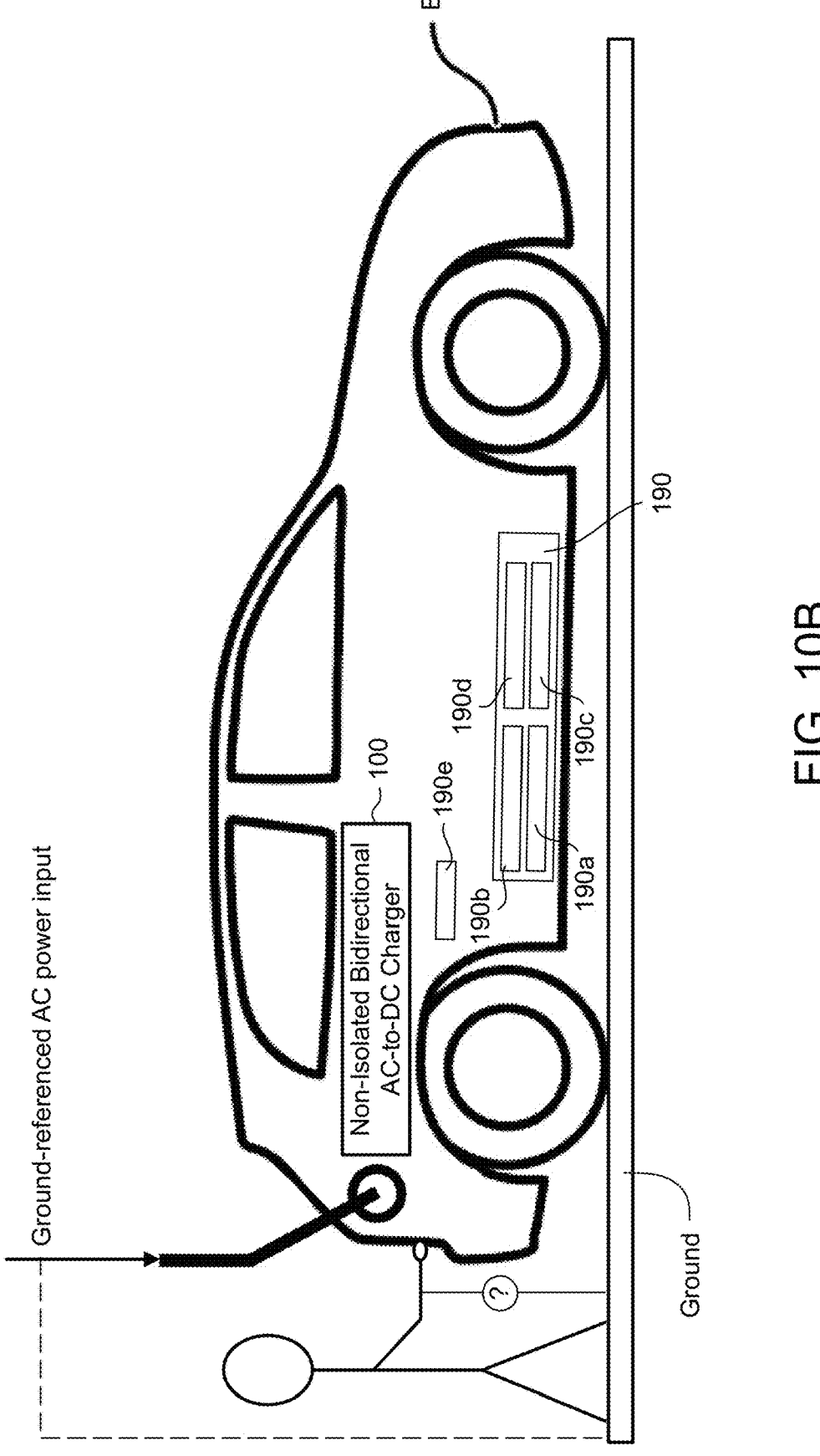

FIG. 10B schematically illustrates an alternative embodiment presented in FIG. 10A, in which an EV is DC charged using an on-board grounded or non-isolated charger 100 receiving AC power directly from the AC mains.

Figure 11:
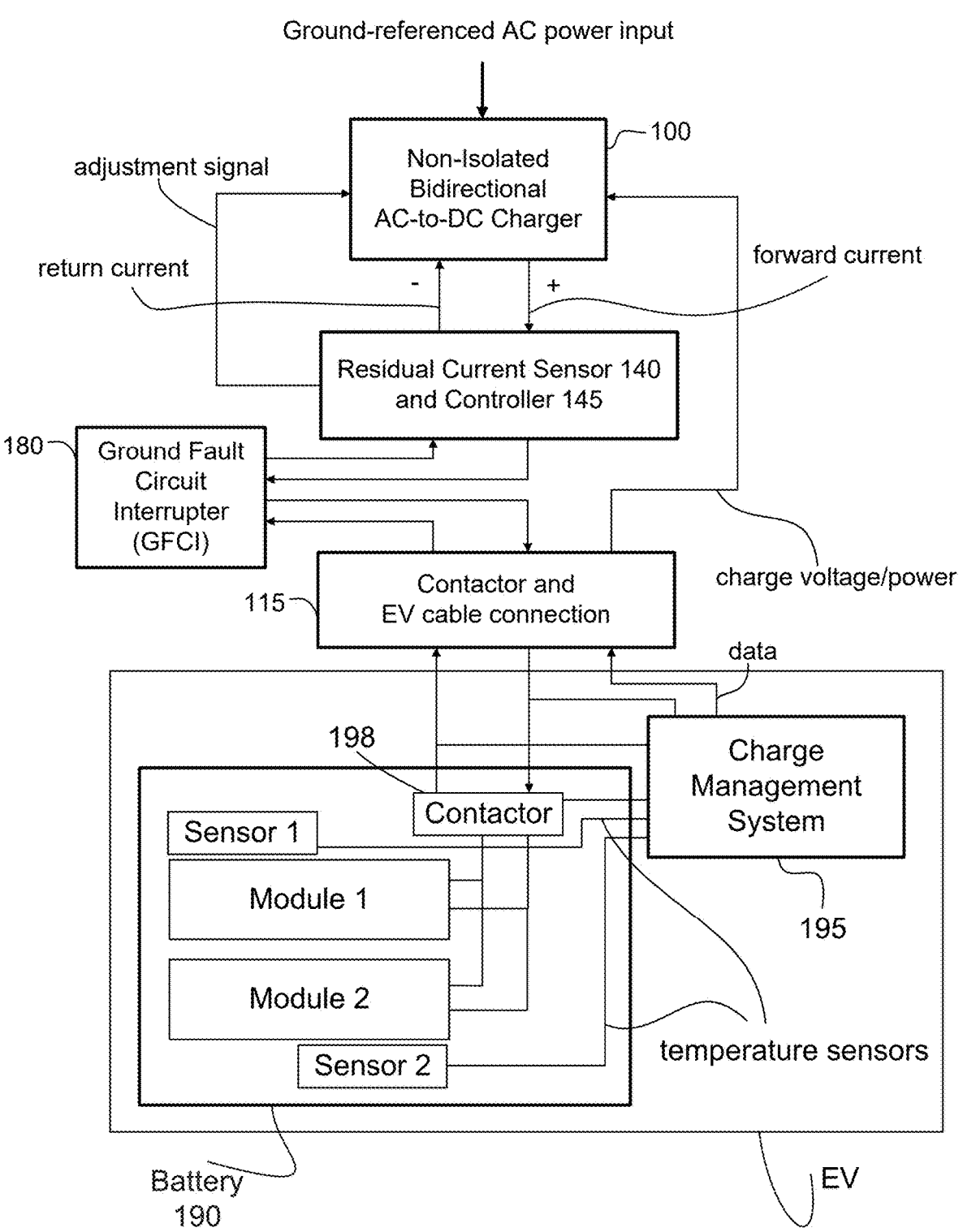
FIG. 11 is a schematic block diagram of a non-isolated controlled EV charger in accordance with an embodiment of the present disclosure.

FIG. 11 illustrates a block diagram of an embodiment in which a controller 145 of non-isolated bidirectional AC-to-DC charger 100 is responsive to an adjustment signal generated by a residual current sensor 140, when the latter may detect a leakage current above a predefined threshold, for example, in the residual DC current standard, is about 20 mA. The residual current sensor 140 and controller 145 measure the forward and return currents in the electrical connection to the EV. A GFCI device 180 may be placed either before or after the residual current sensor 140 and controller 145 to independently assess residual current and interrupt power flowing to the EV in the event that the residual current exceeds an acceptable threshold. A power contactor and EV cable connection 115 connects the high-voltage DC power between the EV and the bidirectional charger 100. The contactor 115 is controlled by the charger 100 when the charger is ready to connect or disconnect from the battery 190. The charger 100 may comprise at least two AC-to-DC power converters, each of which may be connected to at least one DC-to-DC power converter and, when charger 100 may operate as a rectifier, it may receive a charge voltage signal from BMS 195 of EV's battery and responds to this signal to produce a suitable output DC voltage. This may allow the BMS 195 to control the battery charging conditions for the EV's battery 190.

It is known that an EV battery may comprise groups of connected battery cells (such as, for example, cells 190a/190b/190c/190d shown in FIG. 10A or modules as shown in FIG. 11) that each provide the battery's output voltage. A charge management component of the BMS 195 may measure temperatures of each group.

Figure 12:
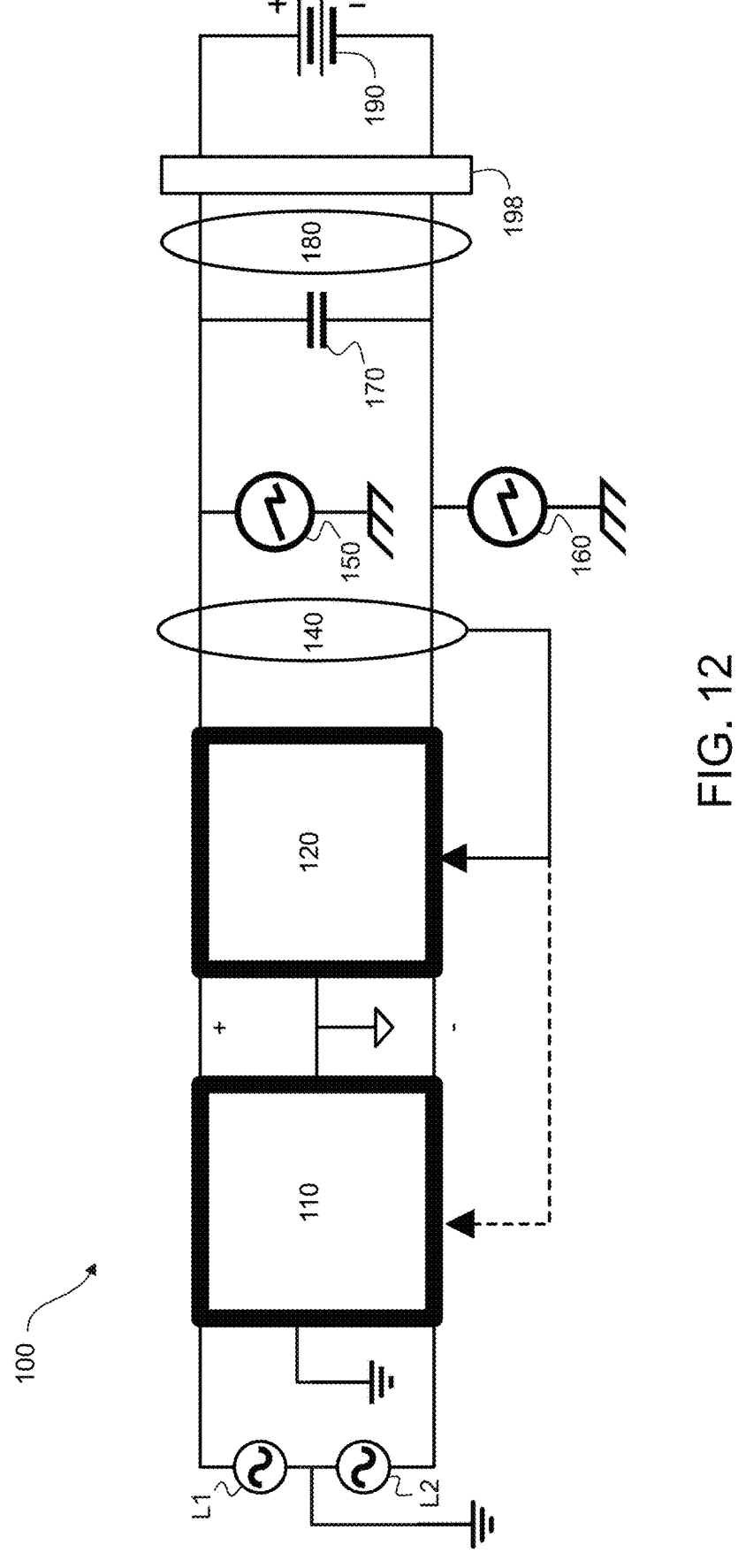
FIG. 12 is a schematic diagram of a non-isolated alternating current to direct current charger in accordance with an embodiment of the present disclosure.

In the embodiment of FIG. 12, non-isolated bidirectional AC-to-DC charger 100 connectable to split-phase AC grid may include at least two AC-to-DC power converters 110, each connected to a respective phase of a split-phase AC grid, and at least one DC-to-DC power converter 120, wherein each output of an AC-to-DC converter 110 may be connected to a DC-to-DC power converter 120, or at least one half-bridge thereof (positive and/or negative half-bridge), via a signal ground line and at least one of a positive voltage line or a negative voltage line with respect to the signal ground. DC-to-DC power converter 120 may provide a relatively positive output line and a relatively negative output line through a residual current sensor 140. The residual current sensor 140 measures a net residual current between the relatively positive output line versus the relatively negative output line. The adjustment signal generated using the residual current sensor 140 may control AC-to-DC power converter 110 (dashed line) or, as shown, DC-to-DC converter 120.

A first voltage sensor 150 may be connected between the relatively positive output line and a chassis ground, and a second voltage sensor 160 may be connected between the relatively negative output line and the chassis ground. A capacitor 170 may be connected between the relatively positive output line and the relatively negative output line.

The relatively positive output line and the relatively negative output line may also pass through a GFCI device 180 before connecting, for example through a contactor or relay 198, to respective positive and negative terminals of battery 190 to be charged or discharged. The inclusion of the CFCI device 180 may ensure that residual current and potentially dangerous ground fault current will not cause harm in the case of a malfunction in the residual current sensor 140 and controller 145. At least one DC-to-DC power converter 120 may actively control its output signal over the relatively positive output line and the relatively negative output line using at least one of the first voltage sensor or the second voltage sensor, to achieve a low-ripple output signal that does not needlessly trip GFCI 180 under normal operation.

Figure 13:
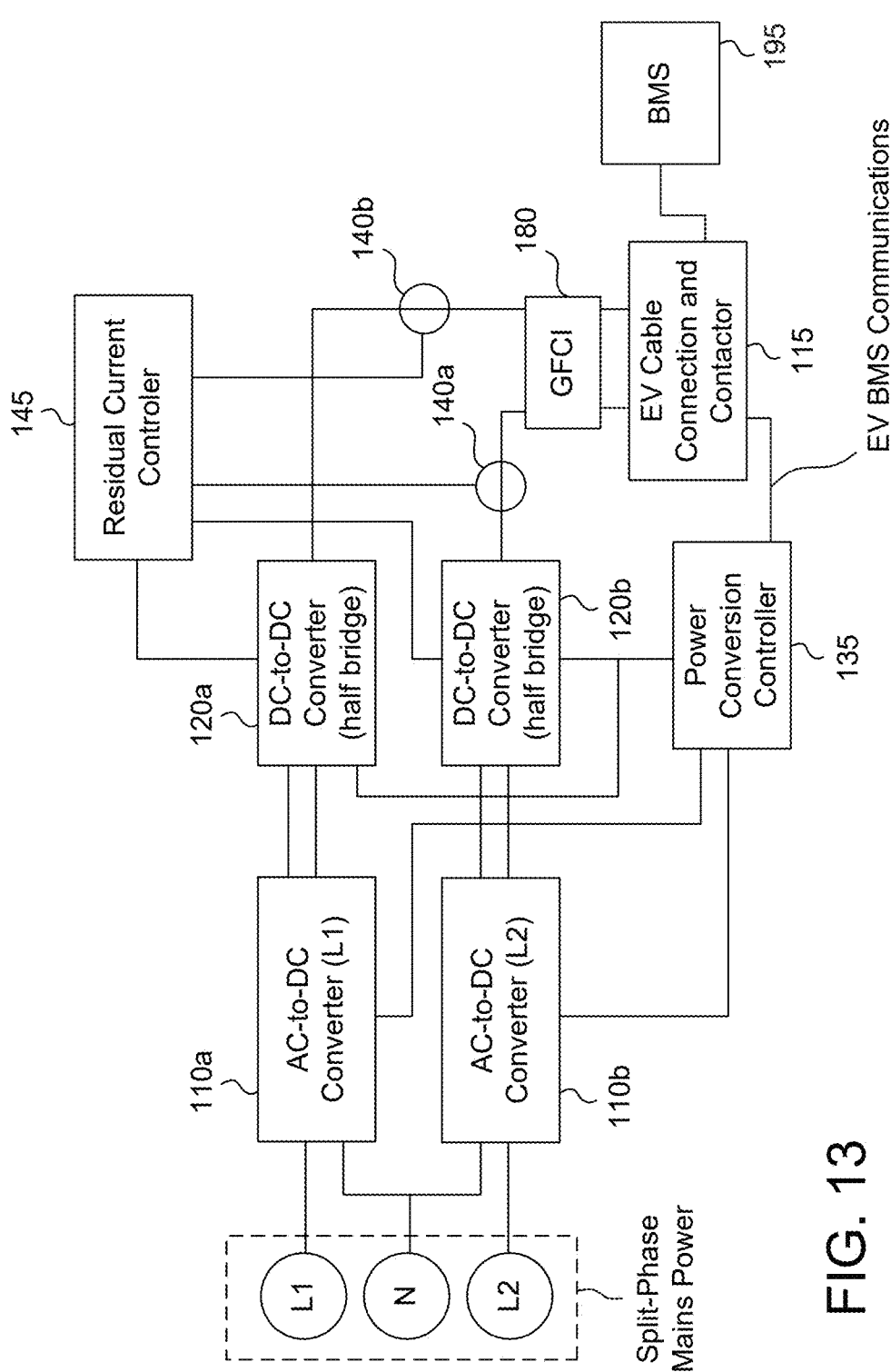
FIG. 13 is schematic block diagram of a non-isolated EV charger having two AC-to-DC converters connected to each of split-phase AC grid L1, L2 and N terminals, and two DC-to-DC converters, in which ground-fault current is prevented at the DC connection to the EV by separating the supply of forward current from the supply of return current in the DC connection to the EV, measuring residual current and controlling the balance of forward current with respect to return current to maintain a safe supply of DC power to the EV without using any isolation transformer or wireless coupling.

FIG. 13 schematically illustrates more detailed view of an embodiment of a non-isolated bidirectional EV charger 100 comprising two non-isolated AC-to-DC converters 110a/110b, each of which may be connectable to a corresponding split-phase AC terminal, i.e., L1 or L2, and to neutral N. In this example, non-isolated AC-to-DC converters 110a/110b may be connected to L1/L2 terminals. Furthermore, each AC-to-DC converter 110a/110b may be connected to a positive/negative half-bridge 120a/120b of DC-to-DC converter 120, respectively. Each half-bridge 120a/120b of DC-to-DC converter 120 may be connected to a residual current sensor 140 (here illustrated as two sensors 140a/140b, respectively) that may further be connected to the residual current controller 145 connected to the output lines of DC-to-DC converter 120. The ground-fault current is prevented at the DC connection to an EV by separating the supply of forward current to maintain a safe supply of DC power to an EV without using any isolation transformer or wireless coupling. Furthermore, power conversion controller 145 may be connected to both AC-to-DC converters 110a/110b, as well as to half-bridges 120a/120b of DC-to-DC converter 120. Power conversion controller 135 receives communication from BMS 195 through EV cable connection 115, to control and negotiate charging/discharging process. While not shown in FIG. 13, the BMS 195 also provides the DC connection to the storage battery, for example through a contactor 198. Furthermore, an EV charger may comprise a GFCI 180, which may be connected to residual current sensor 140, which, in this example, is provided by sensors 140a/140b. GFCI 180 may also constitute a part of EV cable connection 115.

It may be appreciated by a person skilled in the art that if non-isolated bidirectional AC-to-DC charger 100 is installed on board of an EV, such as, for example, illustrated in FIG. 10B, EV cable connection 115 may be internal to the EV. Moreover, AC-to-DC converters 110a/110b may use either separate converters or may use motor drive inverters of the EV. The DC-to-DC converters 120a/120b may be added components along with power conversion controller 135 and residual current controller 145, so that GFCI protection functions properly on board of the EV.

Figure 14:
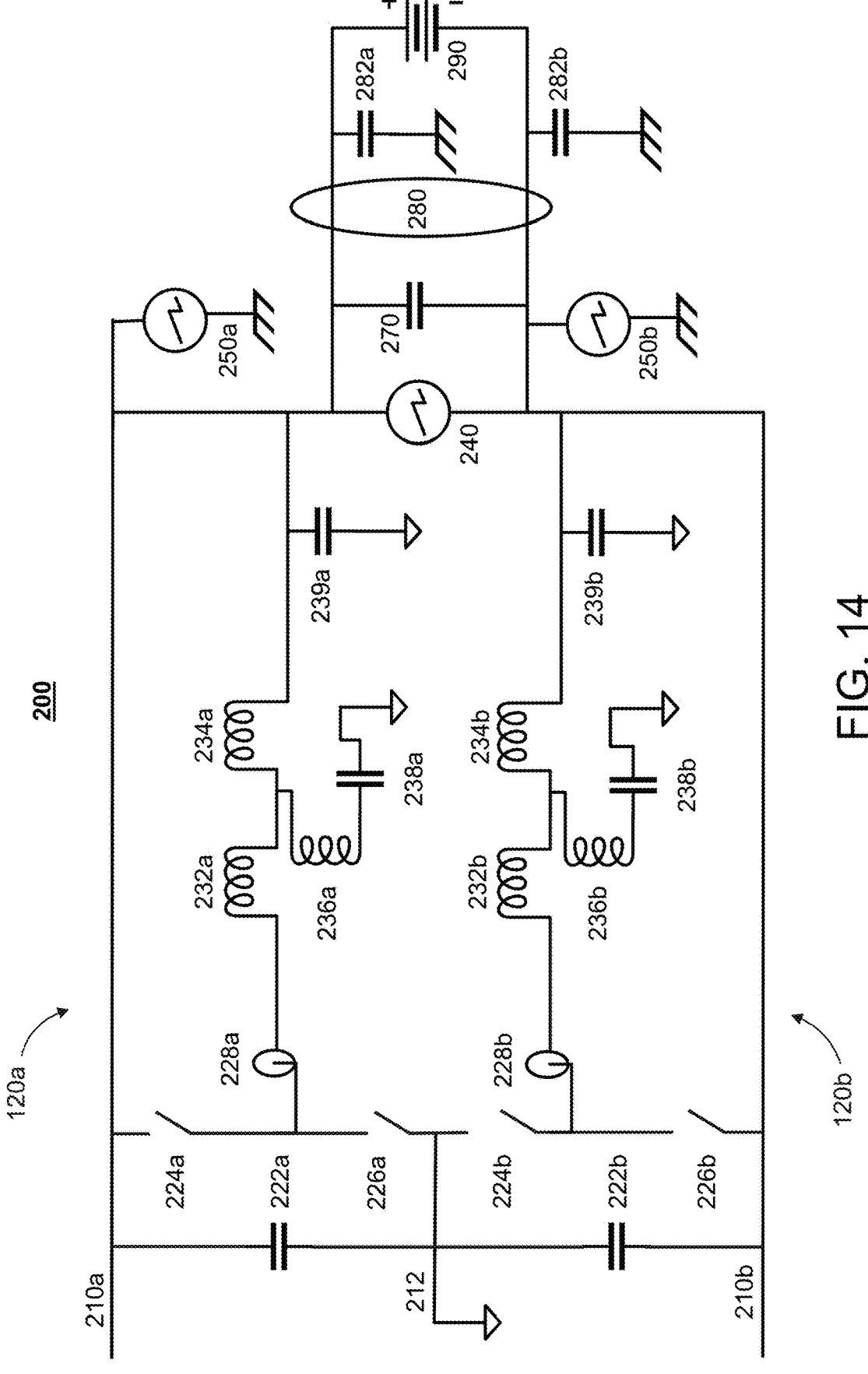
FIG. 14 is a schematic diagram of a DC-to-DC converter for the non-isolated alternating current to direct current charger of FIG. 12.

Turning to FIG. 14, a circuit topology of non-isolated DC-to-DC converter 120 is indicated generally by the reference numeral 200. The circuit topology 200 of DC-to-DC converter 120 may include at least one half-bridge that receives from a non-isolated AC-to-DC converter such as 110a/110b of FIG. 13, inputs including at least one voltage line 210 and/or a signal ground 212. In an embodiment, the circuit topology 200 of non-isolated DC-to-DC converter 120 may include two half-bridges including a top half-bridge respectively indicated by reference numeral suffix "a" and a bottom half bridge respectively indicated by reference numeral suffix "b". Each half-bridge 120a/120b respectively may include a capacitor 222a/222b disposed between its at least two inputs, a primary switch 224a/224b connected to its higher potential input, a secondary switch 226a/226b connected to its lower potential input, a primary node connected between the primary switch and the secondary switch and may include a current sensor 228a/228b connected to the primary node. For example, current sensor 228a/228b may be an integrated current sensor using differential measurement without a ferrite core.

Each half-bridge 120a/120b may further include a primary inductor 232a/232b connected between the primary node or the current sensor 228a/228b and a secondary node, respectively, and a secondary inductor 234a/234b connected between the secondary node and an output line. Primary inductor 232a/232b and secondary inductor 234a/234b, respectively, may share a same core. A tertiary inductor 236a/236b may be connected in series with a secondary capacitor 238a/238b, respectively, between the secondary node and the signal ground. A voltage sensor 250a/250b may be connected between the output line and a chassis ground. The output line may be connected to a positive or a negative terminal of a DC battery 290.

Top half-bridge 120a may have its input line 210a connected to the positive input from the AC-to-DC converter 110a of FIG. 13, and bottom half-bridge 120b may have its input line 210a connected to the negative input from the AC-to-DC converter 110b of FIG. 13. The corresponding components of top half-bridge 120a and bottom half-bridge 120b may each be substantially the same as described above, so duplicate description may be omitted.

This two half-bridge embodiment may further include a voltage sensor 240 connected between the output line of the top half bridge (top output line) and the output line of the bottom half bridge (bottom output line), a tertiary capacitor 270 connected in parallel with the voltage sensor between the output lines of the top half bridge and the bottom half-bridge, and a GFCI 280 inductively coupled to the output lines of the top half-bridge and the bottom half-bridge. Moreover, the output line of the top half-bridge may be connected to the positive terminal of the battery 290, and the output line of the bottom half-bridge may be connected to the negative terminal of the battery 290.

In an embodiment, circuit topology 200 of non-isolated DC-to-DC converter 120 may include a top input line 210a; a top output line connectable to a positive terminal of a DC battery 290; a top primary switch 224a connected between the top input line 210a and a top primary node; a top secondary switch 226a connected between the top primary node and a signal ground; a top primary inductor 232a connected between the top primary node and a top secondary node; a top secondary inductor 234a connected between the top secondary node and the top output line; a top tertiary inductor 236a connected between the top secondary node and the signal ground; and a top sensor 250a connected between the top output line and a chassis ground.

This embodiment may also include a bottom input line 210b; a bottom output line connectable to a negative terminal of the DC battery 290; a bottom primary switch 224b connected between the bottom input line 210b and a bottom primary node; a bottom secondary switch 226b connected between the bottom primary node and the signal ground; a bottom primary inductor 232b connected between the bottom primary node and a bottom secondary node; a bottom secondary inductor 234b connected between the bottom secondary node and the bottom output line; a bottom tertiary inductor 236b connected between the bottom secondary node and the signal ground; and a bottom sensor 250b connected between the bottom output line and the chassis ground.

This embodiment may also include a top primary capacitor 222a connected between the top input line 210a and the signal ground, a top secondary capacitor 238a connected between the top tertiary inductor 236a and the signal ground, a top tertiary capacitor 239a connected between the top output line and the signal ground; a bottom primary capacitor 222b connected between the bottom input line 210b and the signal ground, a bottom secondary capacitor 238b connected between the bottom tertiary inductor 236b and the signal ground, a bottom tertiary capacitor 239b connected between the bottom output line and the signal ground.

In this embodiment, each of the sensors 250a and 250b may be voltage sensors, although current sensors may be adapted in alternate embodiments. Moreover, another voltage sensor 240 may be connected between the top output line and the bottom output line. In addition, another capacitor may be connected between the top output line and the bottom output line.

A residual current sensor 280 may be coupled to the top output line and the bottom output line. While the sensor is illustrated by an oval, in a manner suggestive of a coil used for sensing residual AC current, the sensor used for sensing DC current is typically of a different structure. The battery 290 may be a rechargeable multi-cell battery of about 400 V to 1000 V connected to the top output line and the bottom output line via a user-accessible charging port of an EV. Moreover, the top output line may be connected through a top tertiary capacitor 282a to the chassis ground, and the bottom output line may be connected through a bottom tertiary capacitor 282a to at least one of the chassis ground or to Earth ground, without limitation. Typically, the EV charger cable will provide earth ground to the EV.

In an embodiment, the top primary inductor 232a and the bottom primary inductor 232b may have a shared core. Similarly, the top secondary inductor 234a and the bottom secondary inductor 234b may have a shared core. Each shared core may be ferrite or magnetic. Moreover, each of the inductors 232a, 232b, 234a, and 234b may share a same core. In addition, the tertiary inductors 236a and 236b may similarly have a shared core, which may be the same or different from the cores of the other inductors.

Figure 15:
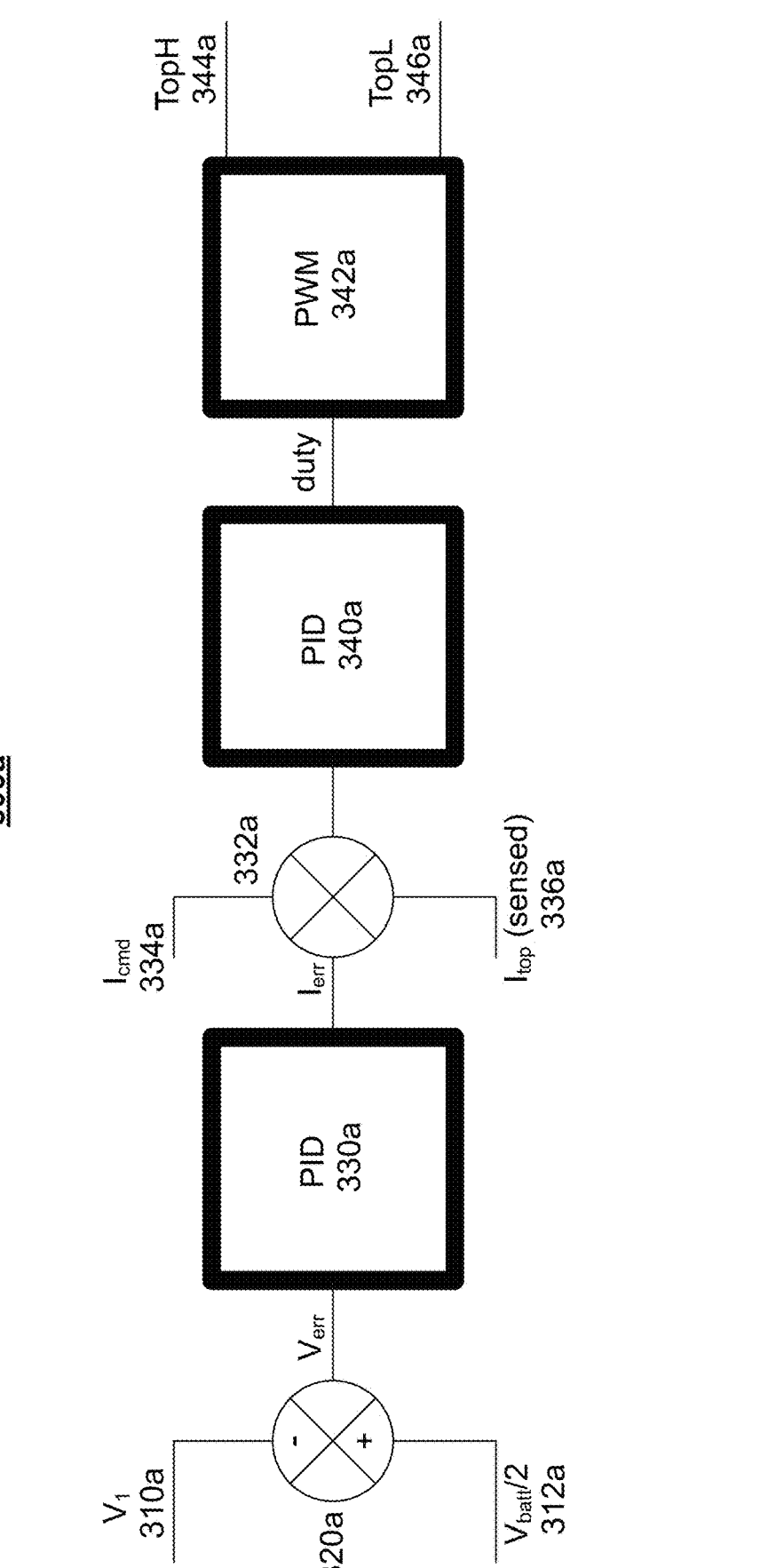
FIG. 15 is a schematic diagram of a control system for the non-isolated direct current to direct a state-of-the-art current converter that may use an isolation transformer between the grid and the power converter.

Turning now to FIG. 15, a controller for one half-bridge of a DC-to-DC converter 120 in a non-isolated battery charger 100 is indicated generally by the reference numeral 300a. The controller 300a may include a primary voltage signal ($V_1$) input 310a and a half-bridge battery input signal ($V_{batt}/2$). A voltage junction 320a provides $V_{batt}/2$ minus $V_1$ as a voltage error signal ($V_{err}$) to a primary proportional-integral-derivative (PID) controller 330a, which, in turn, provides a current error signal ($I_{err}$) to a current junction 332a. The current junction also receives a current command signal ($I_{cmd}$) and a sensed current ($I_{top}$) and connects the resultant signal to a secondary PID controller 340a.

The secondary PID controller 340a may provide a duty cycle signal to a pulse-width modulation (PWM) modulator 342a, which, in turn, may provide a top high control signal (TopH) via an output terminal 344a to control the top primary switch 224a, and a top low control signal (TopL) via an output terminal 346a to control the top secondary switch 226a. For example, the switches 224a and 226a may be controlled in a substantially complimentary configuration, where one is substantially off while the other is substantially on, without limitation thereto.

It will be appreciated that the comparison of $V_1$ to $V_{batt/2}$ or $V_{err}$ and the use of the PID 330a is an example of a controller associated with a residual current sensor that provides an adjustment signal, in this case, $I_{err}$. Likewise, components 332a, 340a and 342a are an example of part of a control system for the power switches of the non-isolated AC-to-DC power converter.

It will be appreciated that the adjustment signal is actively adjusting the instantaneous voltage delivered to the EV in a manner that counteracts what is measured as residual current. While this countering may be used to prevent the GFCI from "tripping" due to the apparent residual current caused by ripples and other fluctuations in the DC power delivered to the EV, in the case of an actual fault, the risk of harm to a person touching the car as illustrated in FIG. 10A or 10B is reduced. For example, if the positive DC terminal connected to the EV were to be shorted to the EV's body, thus presenting hundreds of volts on the conductive body, current passing through the EV's body, that is relatively well insulated from ground by its rubber tires, may preferentially pass through the person to ground if the person is the path of least resistance. Such current would reduce the return current in comparison to the forward current. The response of the charger 100 to the resulting adjustment signal is to drop the voltage passing into the car. Because the residual current in this case is an actual fault to ground, this adjustment is not a very short-lived adjustment, but instead would result in the adjustment signal continuously causing the forward voltage to drop until the current passing through the person is well below the permitted threshold of, say, 20 mA of AC current and 6 mA DC current. Alternatively, the controller 145 can detect the difference between compensation for ripple in the DC supply to the battery or short-lived changes in residual current and longer duration residual currents resulting from a ground fault, and then, in the case of a ground fault being detected by the controller 145, signal to the charger 100 to stop charging and enter into a warning state to have the operator check for a ground fault.

Therefore, in some embodiments, the controlled charger 100 may never be capable of producing DC charge power that would ever trip the GFCI 180 because it would effectively shut down before that could happen. The GFCI 180 may, therefore, be a failsafe in the case of failure of the control mechanism of the charger 100. Alternatively, the degree of adjustment of the DC power going into the EV may be limited to compensate only for the non-uniformity of the DC power, for example, by limiting its ability to adjust instantaneously the voltage supplied by only +/− a given percentage, and the GFCI may be relied upon when this adjustment is insufficient.

The controller 300a may include a primary PID controller responsive to a battery voltage and a difference voltage; a secondary PID controller responsive to the primary PID controller, a command current and a difference current; and a pulse-width modulation (PWM) modulator responsive to the battery voltage, the difference voltage, the command current, and the difference current.

In an embodiment, where the above controller 300a is applied to one half bridge of the converter 200, a comparable "b" controller may be independently applied to the other half bridge of the converter 200. For example, where the controller 300a controls the switches 224a and 226a of the top half bridge, the comparable controller may independently control the switches 224b and 226b of the bottom half bridge, without limitation thereto. Substantially duplicate description may be omitted.

In an embodiment, where the above controller 300a is applied to one of either the top half bridge or the bottom half-bridge of the converter 200, it may be time-shared between the top half bridge and the bottom half bridge, without limitation thereto. Such time sharing may be substantially equal or may be biased towards one half bridge depending upon actual and/or predicted signal ripple. For example, the controller 300a may control the switches 224a and 226a during odd periods and control the switches 224b and 226b during even periods, without limitation thereto.

In an embodiment, where the above controller 300a is applied to one half bridge of the converter 200, a comparable controller for another half bridge, and/or potentially the other half bridge itself, may be omitted. For example, a positive terminal of the battery 290 may be connected to the secondary inductor 234a, and a negative terminal of battery 290 may be connected to signal ground, without limitation thereto.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A bidirectional power converter for converting electrical power between AC and DC, the bidirectional power converter comprising:

an AC phase terminal;

an AC neutral node terminal;

a first DC terminal;

a second DC terminal;

a first front end power switch having a first side connected to AC phase terminal;

a second front end power switch having a first side connected to AC phase terminal;

a front capacitor connected on one side to a second side of the first front end power switch and on another side to a second side of the second front end power switch;

a first inductor connected on a first side to the second side of the first front end power switch;

a second inductor connected on a first side to the second side of the second front end power switch, the first inductor and the second inductor being magnetically coupled;

a first pair of back end power switches connected together in series at a first side that is also connected to a second side of said first inductor, a second side of one of said first pair of back end power switches being connected to the AC neutral node terminal, a second side of another of said first pair of back end power switches being connected to the first DC terminal;

a second pair of back end power switches connected together in series at a first side that is also connected to a second side of said second inductor, a second side of one of said second pair of back end power switches being connected to the AC neutral node terminal, a second side of another of said second pair of back end power switches being connected to the second DC terminal;

a second capacitor and a third capacitor connected together in series at a first side that is also connected to the AC neutral node terminal, a second side of the second capacitor connected to the first DC terminal, and a second side of the third capacitor connected to the second DC terminal; and a power converter controller operative to receive an input defining a direction of power conversion from AC to DC or DC to AC and a level of power conversion or a target output voltage of power conversion and to generate gate signals for said first and second frond end and said first and second pair of back end power switches to accordingly.

2. The bidirectional power converter as defined in claim 1, wherein said power converter controller comprises:

a reference controller for receiving said input defining a direction of power conversion from AC to DC or DC to AC and said level of power conversion or said target output voltage of power conversion and for defining a phase and amplitude of a reference signal;

a reference generator for generating the reference signal according to said phase and amplitude;

at least two carrier signal generators for generating at least two carrier signals;

at least two comparator logic circuits for comparing the reference to the at least two carrier signals to produce at least some of said gate signals.

3. The bidirectional power converter as defined in claim 1, wherein said power converter controller comprises:

a reference controller for receiving said input defining a direction of power conversion from AC to DC or DC to AC and said level of power conversion or said target output voltage of power conversion and for defining a sequence of switch gate states; and a switch gate state sequence memory for storing said sequence of switch gate states; and a switch gate state reader controlled by a timer or clock for outputting at least some of said gate signals.

4. The bidirectional power converter as defined in claim 1 wherein the first inductor and the second inductor are magnetically coupled with a magnetic coupling at least about 40%.

5. The bidirectional power converter as defined in claim 4, wherein the first inductor and the second inductor are magnetically coupled with a magnetic coupling at least about 50%.

6. The bidirectional power converter as defined in claim 1, wherein total harmonic distortion at said AC phase terminal is less than about 3.2% when said bidirectional power converter is operated to convert DC power to AC power.

7. The bidirectional power converter as defined in claim 6, wherein and the first inductor and the second inductor are magnetically coupled with a magnetic coupling of between about 50% to about 80%.

8. The bidirectional power converter as defined in claim 1, wherein said AC phase terminal and said AC neutral node terminal are not connected to an EMI filter.

9. The bidirectional power converter as defined in claim 1, wherein said AC phase terminal comprises a first phase terminal, a second phase terminal and a third phase terminal, said first front end power switch, said second front end power switch, said front capacitor, said first inductor, said second inductor, first pair of back end power switches and said a second pair of back end power switches form a circuit module for single phase, said bidirectional power converter comprising three said circuit modules, said power converter controller being operative to convert power between three-phase AC to DC.

10. The bidirectional power converter as defined in claim 1, further comprising:

at least one DC-to-DC power converter connected on a first side to said first DC terminal and to said second DC terminal and on a second side to a positive terminal and to a negative terminal, said positive terminal and said negative terminal connectable to an electric vehicle (EV);

a residual current sensor configured to measure at least one of a current difference between current flowing through said positive terminal versus current flowing through said negative terminal, or a voltage difference between a voltage across said positive terminal and said negative terminal versus a voltage across at least one of said positive terminal or said negative terminal and a chassis ground; and a residual current controller connected to said residual current sensor and to said at least one DC-to-DC power converter and configured to provide an adjustment signal to an adjustment input in response to said residual current sensor measurement, wherein said residual current controller in combination with said at least one DC-to-DC power converter is configured, when said positive terminal and said negative terminal are connected to an EV, to prevent a current difference between current flowing through said positive terminal and current flowing through said negative terminal from exceeding a predetermined threshold associated with a ground fault circuit interrupter (GFCI) device connectable to interrupt current flow through said positive terminal and said negative terminal to said EV.

11. The bidirectional power converter as defined in claim 10, further comprising said GFCI device.

12. The bidirectional power converter as defined in claim 10, further comprising:

a second AC phase terminal;

a second phase first front end power switch having a first side connected to second AC phase terminal;

a second phase second front end power switch having a first side connected to second AC phase terminal;

a second phase front capacitor connected on one side to a second side of the second phase first front end power switch and on another side to a second side of the second phase second front end power switch;

a second phase first inductor connected on a first side to the second side of the second phase first front end power switch;

a second phase second inductor connected on a first side to the second side of the second phase second front end power switch, the second phase first inductor and the second phase second inductor being magnetically coupled;

a second phase first pair of back end power switches connected together in series at a first side that is also connected to a second side of said second phase first inductor, a second side of one of said second phase first pair of back end power switches being connected to the AC neutral node terminal, a second side of another of said second phase first pair of back end power switches being connected to the first DC terminal;

a second phase second pair of back end power switches connected together in series at a first side that is also connected to a second side of said second phase second inductor, a second side of one of said second phase second pair of back end power switches being connected to the AC neutral node terminal, a second side of another of said second phase second pair of back end power switches being connected to the second DC terminal;

a second phase second capacitor and a second phase third capacitor connected together in series at a first side that is also connected to the AC neutral node terminal, a second side of the second phase second capacitor connected to the first DC terminal, and a second side of the second phase third capacitor connected to the second DC terminal;

wherein said power converter controller is further operative to generate gate signals for said second phase first and second frond end and second phase said first and second pair of back end power switches accordingly.

13. The bidirectional power converter as defined in claim 10, wherein said at least one DC-to-DC power converter comprises a PWM controller responsive to at least one current or voltage sensor, a reference signal, and said adjustment signal.

14. The bidirectional power converter as defined in claim 10, wherein said DC-to-DC power converter comprises a positive half-bridge and a negative half-bridge.

15. The bidirectional power converter as defined in claim 14, wherein said adjustment signal is configured to adjust a duty cycle of power switches associated with one of said positive half-bridge or said negative half-bridge.

16. The bidirectional power converter as defined in claim 10, wherein said predetermined threshold is about 20 mA.

17. The bidirectional power converter as defined in claim 2, wherein the first inductor and the second inductor are magnetically coupled with a magnetic coupling at least about 50%.

18. The bidirectional power converter as defined in claim 3, wherein the first inductor and the second inductor are magnetically coupled with a magnetic coupling at least about 50%.

19. The bidirectional power converter as defined in claim 2, wherein total harmonic distortion at said AC phase terminal is less than about 3.2% when said bidirectional power converter is operated to convert DC power to AC power.

20. The bidirectional power converter as defined in claim 3, wherein total harmonic distortion at said AC phase terminal is less than about 3.2% when said bidirectional power converter is operated to convert DC power to AC power.

* * * * *